(12) United States Patent
Dean et al.

(10) Patent No.: US 11,982,765 B2
(45) Date of Patent: May 14, 2024

(54) SCANNING LASER DEVICES AND METHODS WITH DETECTORS FOR SENSING LOW ENERGY REFLECTIONS

(71) Applicant: Microvision, Inc., Redmond, WA (US)

(72) Inventors: James Dean, Redmond, WA (US); Christopher Cannon, Redmond, WA (US); Alga Lloyd Nothern, III, Seattle, WA (US); Joel Sandgathe, Portland, OR (US)

(73) Assignee: Microvision, Inc., Redmond, WA (US)

( * ) Notice: Subject to any disclaimer, the term of this patent is extended or adjusted under 35 U.S.C. 154(b) by 774 days.

(21) Appl. No.: 17/165,017

(22) Filed: Feb. 2, 2021

(65) Prior Publication Data
US 2022/0244358 A1 Aug. 4, 2022

(51) Int. Cl.
G01S 7/48 (2006.01)
G01S 7/481 (2006.01)
G01S 7/484 (2006.01)
G01S 7/487 (2006.01)
G01S 7/497 (2006.01)
G01S 17/10 (2020.01)
G01S 17/89 (2020.01)

(52) U.S. Cl.
CPC ............ *G01S 7/4817* (2013.01); *G01S 7/484* (2013.01); *G01S 7/487* (2013.01); *G01S 7/497* (2013.01); *G01S 17/10* (2013.01); *G01S 17/89* (2013.01)

(58) Field of Classification Search
None
See application file for complete search history.

(56) References Cited

U.S. PATENT DOCUMENTS

| 3,781,111 | A  | * | 12/1973 | Fletcher | G01S 17/10 356/141.5 |
| 5,917,640 | A  | * | 6/1999 | Staver | G01S 17/08 359/198.1 |
| 8,994,926 | B2 | * | 3/2015 | Dyer | G01S 7/4876 356/3.01 |
| 10,190,916 | B1 | * | 1/2019 | Adams | G01S 17/08 |
| 10,451,715 | B2 | * | 10/2019 | Chu | G01S 7/497 |

(Continued)

OTHER PUBLICATIONS

"International Preliminary Report on Patentability", PCT/US2022/070299, Feb. 2021.

(Continued)

Primary Examiner — Hovhannes Baghdasaryan
(74) Attorney, Agent, or Firm — Kevin D. Wills

(57) ABSTRACT

The embodiments described herein provide systems and methods that can facilitate increased detector sensitivity and reliability in a scanning laser device. Specifically, the systems and methods utilize detectors with multiple sensors that are configured to receive reflections of laser light pulses from objects within a scan field. These multiple sensors are configured to receive these reflections through the same optical assembly used to scan the laser light pulses out to the scan field. Furthermore, the multiple sensors are configured to at least partially cancel the effects of back reflections from within the optical assembly itself. The cancellation of the effects of back reflections from within the optical assembly can improve the sensitivity of the detector, particularly for the detection of low energy reflections of laser pulses from within the scan field.

20 Claims, 18 Drawing Sheets

(56) References Cited

U.S. PATENT DOCUMENTS

| | | | | |
|---|---|---|---|---|
| 10,520,592 | B2* | 12/2019 | Droz | G01S 7/4876 |
| 2004/0208340 | A1* | 10/2004 | Kirschner | G01S 7/487 |
| | | | | 382/103 |
| 2012/0012691 | A1* | 1/2012 | Dryer | G02B 6/06 |
| | | | | 244/3.16 |
| 2013/0062536 | A1* | 3/2013 | Bardos | G01N 21/9501 |
| | | | | 250/459.1 |

OTHER PUBLICATIONS

Microvision, Inc., , "International Search Report and Written Opinion", Jan. 2022.

* cited by examiner

SCANNING LASER DEVICES AND METHODS WITH DETECTORS FOR SENSING LOW ENERGY REFLECTIONS

FIELD

The present disclosure generally relates to scanning laser devices and methods, and more particularly relates to light detectors used in light detection and ranging (LiDAR) systems and methods.

BACKGROUND

Scanning laser devices have been developed and implemented for a wide variety of applications, including object detection. For example, light detection and ranging (LiDAR) systems have been developed to generate 3D maps of surfaces, where the 3D maps describe the variations in depth over the surface. Such object detection and depth mapping have been used in a variety of applications, including object and motion sensing, navigation and control. For example, such LiDAR devices are being used in the navigation and control of autonomous vehicles, including autonomous devices used for transportation and manufacturing.

One limitation in some LiDAR systems is a lack of detector reliability and sensitivity. For example, in some LiDAR systems noise may be prevent the reliable detection of reliability of low energy reflections and thus interfere with the operation of the system. As such, there remains a need for improved systems and methods for detection in LiDAR systems and other scanning laser devices.

DESCRIPTION OF EMBODIMENTS

The embodiments described herein provide systems and methods that can facilitate increased detector sensitivity and reliability in a scanning laser device. Specifically, the systems and methods utilize detectors with multiple sensors that are configured to receive reflections of laser light pulses from objects within a scan field. These multiple sensors are configured to receive these reflections through the same optical assembly used to scan the laser light pulses out to the scan field. Specifically, the multiple sensors are configured to receive reflections through at least some of the same scanning mirrors, beam shaping optics, and other optical elements used to scan the laser light pulses into the scan field. Because the same optical assembly is used by the multiple sensors to receive the laser light reflections any damage or blockage that prevents the multiple sensors from receiving the reflections would also have likely blocked the scanning of the laser light pulses into the scan field. Thus, the detector can more reliably detect any laser light that has impacted an object in the scan field and reflected back toward the detector, and can thus be used to provide increased laser safety.

Furthermore, the multiple sensors are configured to reduce the effects of noise at the detector. Specifically, the multiple sensors are configured to at least partially cancel the effects of back reflections from within the optical assembly itself. In general, back reflections are unwanted reflections of laser light from elements within the system that are received back at the detector and as such can interfere with the detection of reflections from objects within the scan field. The cancellation of the effects of back reflections from within the optical assembly can improve the sensitivity of the detector, particularly for the detection of low energy reflections of laser pulses from within the scan field. This increased sensitivity can facilitate the use of low energy light pulses and thus can facilitate a reliable short range detection mode.

The combination of a detector that uses multiple sensors, where the multiple sensors receive reflections through the same optical assembly that is used to also scan the laser light pulses, and where the multiple sensors are used to at least partially cancel the effects of back reflections, can thus improve both the sensitivity and reliability of laser light detection in scanning laser devices. Furthermore, this combination of features can be used to facilitate the use of low energy light pulses and a short range detection mode that can provide increased laser safety in a variety of scanning laser device applications.

Figure 1:
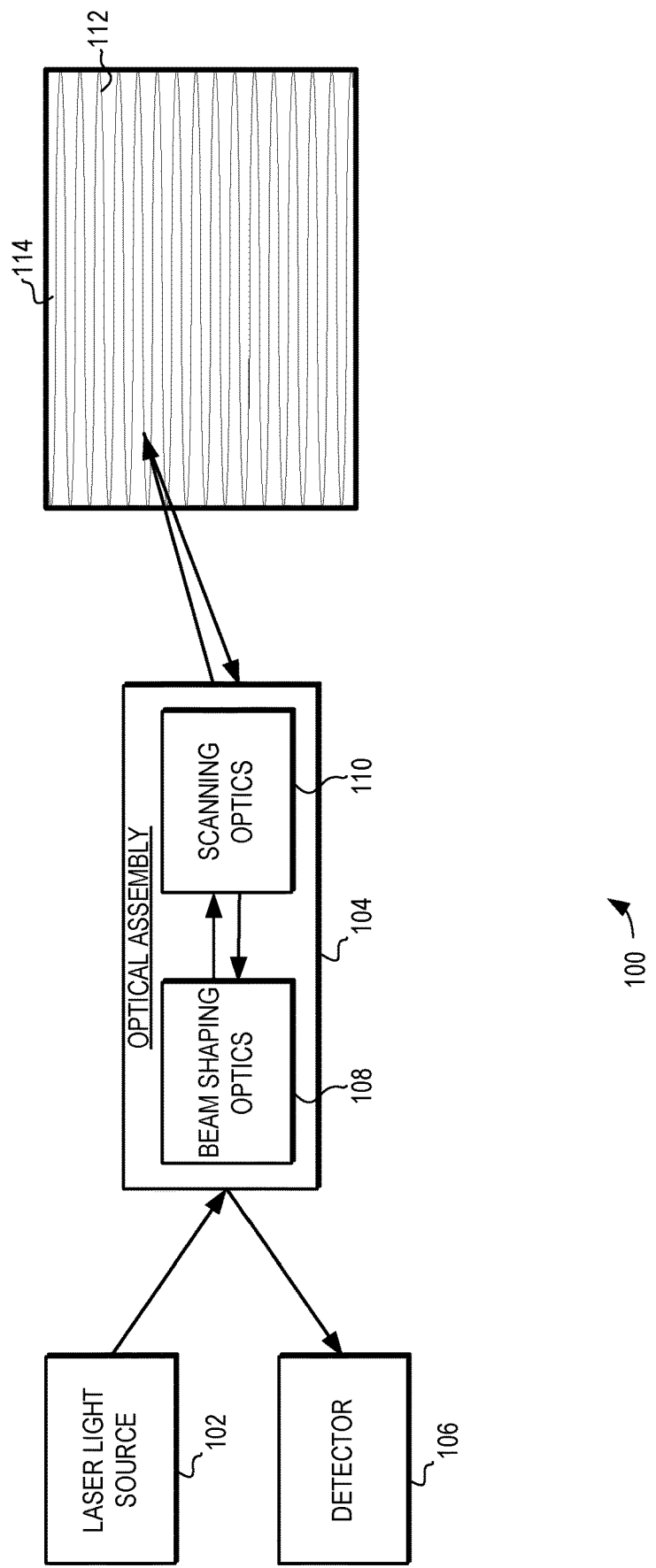
FIG. 1 shows a schematic diagram of a scanning laser device in accordance with various embodiments of the present invention.

Turning now to FIG. 1, a schematic diagram of a scanning laser device 100 is illustrated. In one embodiment, the scanning laser device 100 is a light detection and ranging (LiDAR) system used for object detection and/or 3D map generation. The scanning laser device 100 includes a laser light source 102, an optical assembly 104, and a detector 106. The optical assembly 104 includes a variety of optical elements for laser scanning, including beam shaping optics 108 and scanning optics 110. During operation, the laser light source 102 generates pulses of laser light that are scanned by the optical assembly 104 in a pattern 112 of scan lines inside a scan field 114.

The detector 106 is configured to receive reflections of the laser light pulses from objects within the scan field 114. The received reflections of the laser light pulses can then be used to detect those objects within the scan field 114. For example, time-of-flight (TOF) measurements of the received reflections can be used to generate 3-dimensional point clouds that describe the depth of a surface at each point, and thus can be used to generate a depth map of the object surface.

In the example of FIG. 1, the pattern 112 of scan lines in the scan field 114 comprises a raster pattern. However, this is just one example, and in other embodiments other patterns of scan lines can be generated as used. For example, spiral patterns and Lissajous patterns could instead be used. To facilitate the generation of the pattern 112, a drive circuit can be implemented to controls the movement of scanning optics 110. Examples of this will be described in greater detail below.

In accordance with the embodiments descried herein the detector 106 is implemented to facilitate increased detector sensitivity and reliability. Specifically, the detector 106 is implemented with multiple sensors that are configured to receive reflections of laser light pulses from objects within a scan field 114. These multiple sensors are configured to receive these reflections through the optical assembly 104, which is notably the same optical assembly 104 through which the laser light pulses are scanned to the scan field 114. Thus, the multiple sensors in the detector 106 are configured to receive reflections through the same scanning optics 110 and beam shaping optics 108 used to scan the laser light pulses into the scan field 114.

Because the same optical assembly 104 is used by the multiple sensors to receive the laser light reflections any damage or blockage that prevents the multiple sensors from receiving the reflections would also have likely blocked the scanning of the laser light pulses into the scan field 114. For example, if there is any obstruction (e.g., dirt on the exit optic lens) that prevents the detector 106 from detecting reflections of the laser light pulses from the objects within the scan field 114 will also likely prevent the laser light pulses from being scanned into the scan field 114. Thus, it is relatively unlikely that a nearby object can be scanned with the laser light pulses and not detected by the detector 106.

Furthermore, in accordance with the embodiments described herein, the multiple sensors in the detector 106 are configured to at least partially cancel the effects of back reflections from within the optical assembly 104. In general, back reflections are unwanted reflections of laser light from elements within the optical assembly 104 that are received back at the detector 106 and as such can interfere with the detection of reflections from objects within the scan field 114. For example, back reflections can comprise both specular and scattered back reflections of the various optical elements within the optical assembly 104 (e.g., beam shaping optics 108 and the scanning optics 110). The uncontrolled nature of these back reflections makes it likely that at least some significant portion of the back reflections will reflect back and impact the sensing surfaces in the detector 106.

While some coatings and other elements can be used to reduce the amount of specular and scattered back reflections that are received back at the detector 106, they cannot be completely eliminated. When received back at the detector 106 these specular and scattered back reflections can interfere with the detection of low energy reflections from objects within the scan field 114. Thus, the cancellation of the effects of back reflections from within the optical assembly 104 can improve the sensitivity of the detector, particularly for the detection of low energy reflections of laser light pulses from within the scan field 114. This increased sensitivity can facilitate the use of low energy light pulses and thus can facilitate a reliable eye-safe short range detection mode.

The combination of a detector 106 that uses multiple sensors, where the multiple sensors receive reflections through the same optical assembly 104 that is used to also scan the laser light pulses, and where the multiple sensors are used to at least partially cancel the effects of back reflections from within the optical assembly 104, can thus improve both the sensitivity and reliability of laser light detection in scanning laser devices. Furthermore, this combination of features can be used to facilitate the use of low energy light pulses and a short range detection mode that can provide increased laser safety in a variety of scanning laser device applications.

And as will be described in greater detail below, this combination of features can be implemented to improve laser safety. For example, this combination can be implemented in a scanning laser device that uses a virtual protective housing to improve eye safety.

In one embodiment the multiple sensors in the detector 106 include a first sensor and a second sensor, and the detector 106 further includes a sensing circuit. In such an embodiment the first sensor is configured to receive reflections of the laser light pulses from objects within the scan field 114 through the optical assembly 104 and to further receive back reflections of the laser light pulses from elements within the optical assembly 104. The second sensor is configured to receive back reflections of the laser light pulses from within the optical assembly 104 while not receiving significant reflections from objects within the scan field 114. For example, in one embodiment the second sensor is configured to receive less than 10 percent of the reflected energy from objects in the scan field compared to the reflected energy from objects in the scan field received by the first sensor. In other embodiments the second sensor is configured to receive less than 5 percent of the reflected energy from objects in the scan field compared to the first sensor. Thus, both the first and the second sensor are configured to receive back reflections from within the optical assembly 104, while only the first sensor receive significant reflections from objects within the scan field 114.

In one embodiment the first sensor and second sensors are not optically aligned, and this misalignment allows both the first sensor and the second sensor to receive back reflections, while only the first sensor receives significant reflections from objects within the scan field 114. For example, in one embodiment, the first sensor has a first sensor field of view that is optically aligned with the laser light pulses that are scanned into the scan field. As such, the first sensor will receive reflections of the laser light pulses from objects within the scan field 114 through the optical assembly 104 and will further receive back reflections of the laser light pulses from elements within the optical assembly 104.

Conversely, the second sensor has a second field of view that is not optically aligned with the laser light pulses scanned into the scan field. As such, the second sensor will receive back reflections of the laser light pulses from within the optical assembly 104 while not receiving significant reflections from objects within the scan field 114. In one particular implementation the first sensor and the second sensor have an optical alignment difference of between 1 and 3 degrees.

In one embodiment, the first sensor and second sensor are implemented with optics to be focused at a focal point between 2 and 6 meters from the apparatus. In such an embodiment an additional short range sensor can be implemented in the detector 106. In such an implementation the short-range sensor can be configured with optics to be focused at a focal point less than 2 meters from the apparatus.

A variety of different types of devices can be implemented as the first sensor and second sensor. For example, first and second sensor can each be implemented with silicon photo multipliers (SiPM). In other embodiments the first and second sensor can be implanted with photodiodes, including avalanche photodiodes and PIN photodiodes.

The sensing circuit is coupled to the first sensor and the second sensor and is configured to at least partially cancel the effects of back reflections received at the sensors to generate an output signal indicative of an object in the scan field. For example, in one embodiment the first sensor and the second sensor each generate outputs, and the sensing circuit comprises a subtraction device to subtract an output of the second sensor from an output of the first sensor. The sensing circuit can also comprise calibration circuits. For example, the sensing circuit can comprise a first calibration circuit to calibrate the subtraction of the output of the second sensor from the output of the first sensor. In another embodiment, the sensing circuit can comprise a second calibration circuit to calibrate a threshold for detection of an object in the scan field. Detailed examples of sensing circuits will be described in greater detail below with reference to FIG. 5.

In one embodiment the detector 106 further includes a third sensor. In such an embodiment, the third sensor, like the second sensor, can be configured to receive back reflections of the laser light pulses from within the optical mirror assembly while not receiving significant reflections from objects within the scan field. Again, this can be implemented by providing an optical misalignment between the laser light pulses scanned into the scan the field. In such an embodiment the third sensor would generate an output that is also coupled to the sensing circuit.

In addition to the detector 106 in some embodiments the scanning laser device 100 is implemented to include one or more additional detectors. For example, a second detector can be implemented to receive reflections of the IR laser light pulses of the laser light pulses from within the scan field through a second optical assembly separate from and not including the beam shaping optics and the beam scanning optics of the detector 106.

The scanning laser device 100 can also include other elements. For example, the scanning laser device 100 can also include time-of-flight (TOF) circuitry responsive to the detector 106 to measure distances to objects at the depth measurement points in the scan field.

And in other embodiments the scanning laser device 100 can also include a virtual protective housing circuit that, for a plurality of depth measurement points, causes the laser light source to emit a first IR laser light pulse at a first pulse energy to detect an object within a short range, and responsive to determining that there is no object within the short range causes the laser light source to emit at least one second IR laser light pulse having a total second energy level to detect an object within a long range, wherein the first energy level is lower than the total second energy level. A detailed example of such a virtual protective housing circuit will be described below.

Figure 2:
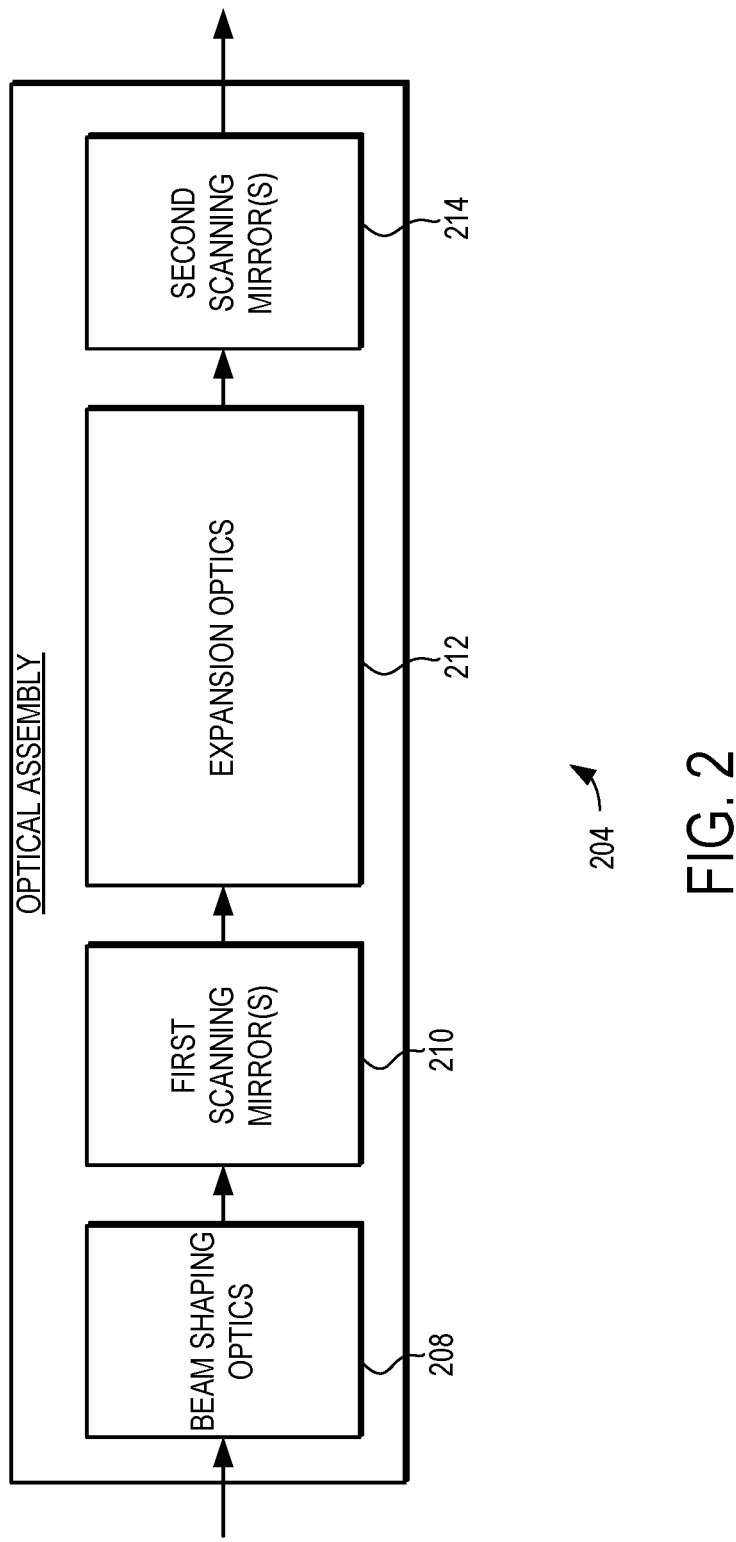
FIG. 2 shows a schematic view of an optical assembly in accordance with various embodiments of the present invention.

Turning now to FIG. 2, a more detailed embodiment of an optical assembly 204 is illustrated. The optical assembly 204 includes optical elements used for scanning laser beam pulses over a scan field. The optical assembly 204 is an example of the type of optical assembly that can be used in a LiDAR or other scanning laser device (e.g., scanning laser device 100) in accordance with the embodiments described herein. The optical elements illustrated in FIG. 2 includes beam shaping optics 208, first scanning mirror(s) 210, expansion optics 212, and second scanning mirror(s) 214, although this is just one non-limiting example. Again, during operation of a scanning laser device a laser light source generates laser light pulses that are scanned by the optical assembly 204 into scan trajectory (e.g., pattern 112) over a scan field (e.g., scan field 114).

For example, the laser light source can comprise one or more infrared (IR) lasers implemented to generate IR laser light pulses. In one specific example, the pulses from multiple IR laser light sources are combined and shaped by beam shaping optics 208. The beam shaping optics 208 can include any optics for changing the beam shape of the laser light pulses. For example, the beam shaping optics 208 can include optical elements for changing the beam shape, changing the beam collimation, combining multiple beams, and aperturing the beam(s).

The output of the beam shaping optics 208 is passed to the first scanning mirror 210. In general, the first scanning mirror 210 provides for one axis of motion (e.g., horizontal), while the second scanning mirror 214 provides for another, typically orthogonal, axis of motion (e.g., vertical). Thus, the first scanning mirror 210 scans the laser beam pulses across one direction (e.g. horizontal), while the second scanning mirror 214 scans across the other direction (e.g., vertical). Furthermore, in a typical implementation of such an embodiment, the first scanning mirror 210 is operated to provide the scanning motion at one rate (e.g., a relatively slow scan rate), while the second scanning mirror 214 is operated to provide motion at a different rate (e.g., a relatively fast scan rate). Together, this results in the laser light pulses being scanned into scan trajectory pattern (e.g., pattern 112). It further be noted labels "vertical" and "horizontal" used herein are somewhat arbitrary, since a 90 degree rotation of the scanning laser device will effectively switch the horizontal and vertical axes.

The output of the first scanning mirror 210 is passed to the expansion optics 212. In general, the expansion optics 212 are implemented to provide an expansion of the scan field in one or more directions. For example, the expansion optics 212 can be implemented to provide an angular expansion along the axis of motion of the first scanning mirror 210. Thus, in one example where the first scanning mirror 210 provides relatively slow speed scanning along the horizontal axis, the expansion optics 212 can be implemented to increase the scanning angle along in the horizontal direction. As one specific example, the first scanning mirror 210 can be implemented to provide a scanning angle in the horizontal direction of 40 degrees, and the expansion optics 212 can be implemented to expand the scanning angle to 110 degrees, thus expanding the size of the resulting scan trajectory and scan field.

To provide this expansion the expansion optics 212 can be implemented with one or more lenses, with the one or more lenses configured to together provide the desired angular expansion. In one specific example, the expansion optics 212 is implemented with three separate lenses. A description of such an embodiment will be described in greater detail below.

The output of the expansion optics 212 is passed to the second scanning mirror 214. Again, the first scanning mirror 210 provides for one axis of motion (e.g., horizontal), while the second scanning mirror 214 provides for another, typically orthogonal, axis of motion (e.g., vertical). Furthermore, the first scanning mirror 210 and second scanning mirror 214 operate at different scan rates. In one specific embodiment the second scanning mirror 214 provides vertical high rate scanning, while the first scanning mirror 210 provides horizontal low rate scanning.

During operation, optical assembly 204 thus operates to receive laser light pulses and scan those laser light pulses into a scan trajectory pattern inside a scan field.

As describe above, one issue during operation of a scanning laser device is that the various elements inside the optical assembly 204 may generate unwanted back reflections. For example, back reflections in the form of both specular and scattered back reflections can be created when the laser beam pulses impact the beam shaping optics 208, the first scanning mirror 210, the expansion optics 212, and the second scanning mirror 214. In each case a portion of the unwanted back reflections can be reflected back to the detector and interfere with the detection of low energy reflections from objects within the scan field.

Figure 3:
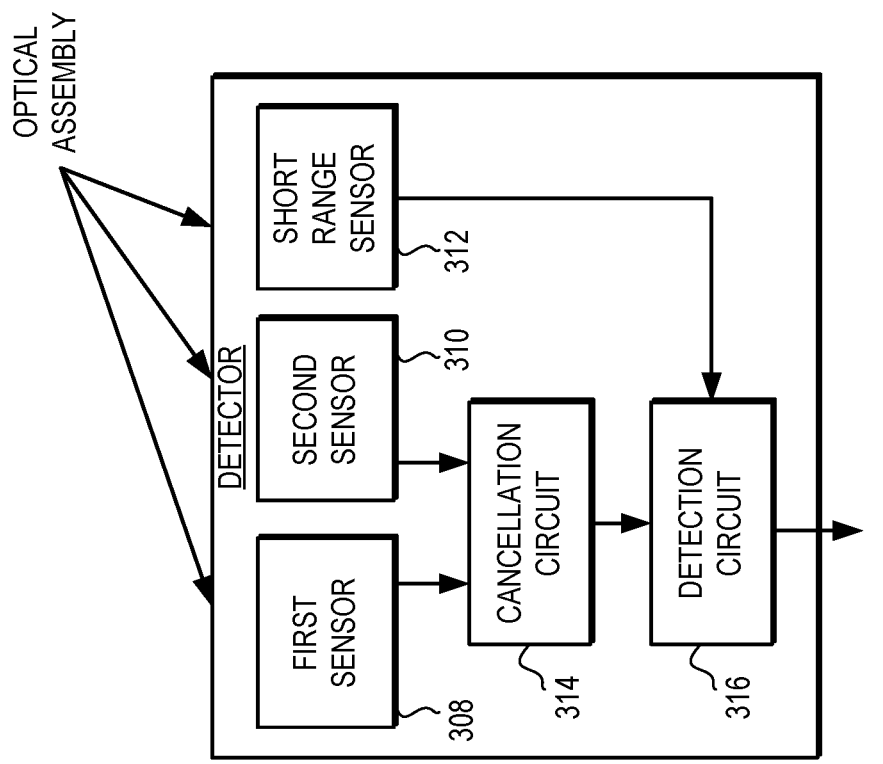
FIG. 3 shows a schematic view of an detector in accordance with various embodiments of the present invention.

Turning now to FIG. 3, a more detailed embodiment of a detector 306 is illustrated. The detector 306 is a more detailed example of the type of detector that can be used in a LiDAR or other scanning laser device (e.g., detector 106 in scanning laser device 100) in accordance with the embodiments described herein. The detector 306 illustrated in FIG. 3 includes a first sensor 308, a second sensor 310, a short range sensor 312, a cancellation circuit, and a detection circuit.

In general, the detector 306 is implemented to facilitate increased detector sensitivity and reliability. Specifically, the detector 306 is implemented with the first sensor 308, second sensor 310, and short range sensor 312 that are configured to receive reflections of laser light pulses from objects within a scan field. The first sensor 308, second sensor 310, and short range sensor 312 are configured to receive these reflections through the optical assembly in the scanning laser device, which is notably the same optical assembly through which the laser light pulses are scanned to the scan field.

The first sensor 308 and the second sensor 310 are configured to facilitate the at least partially cancellation of the effects of back reflections from within the optical assembly. Specifically, the first sensor 308 is configured to receive reflections of the laser light pulses from objects within the scan field and to further receive back reflections of the laser light pulses from elements within the optical assembly. The second sensor 310 is configured to receive back reflections of the laser light pulses from within the optical assembly while not receiving significant reflections from objects within the scan field. Thus, both the first sensor 308 and the second sensor 310 are configured to receive back reflections from within the optical assembly, while only the first sensor 308 receives significant reflections from objects within the scan field.

The first sensor 308 and the second sensor 310 can implemented to provide this different response to different reflections by being implemented with different optical alignments. Specifically, the first sensor 308 and second sensor 310 are implemented to be not optically aligned, and this misalignment allows both the first sensor 308 and the second sensor 310 to receive back reflections, while only the first sensor 308 receives significant reflections from objects within the scan field.

In one specific implementation, the first sensor 308 has a first sensor field of view that is optically aligned with the laser light pulses that are scanned into the scan field. As such, the first sensor 308 will receive reflections of the laser light pulses from objects within the scan field through the optical assembly and will further receive back reflections of the laser light pulses from elements within the optical assembly.

Conversely, in this specific implementation the second sensor 310 has a second field of view that is not optically aligned with the laser light pulses scanned into the scan field. As such, the second sensor 310 will receive back reflections of the laser light pulses from within the optical assembly 104 while not receiving significant reflections from objects within the scan field. For example, in one embodiment the second sensor 310 is optically aligned to receive less than 10 percent of the reflected energy from objects in the scan field compared to the reflected energy from objects in the scan field received by the first sensor 308. In other embodiments the second sensor 310 is optically aligned to receive less than 5 percent of the reflected energy from objects in the scan field compared to the first sensor 308.

In one particular implementation the first sensor 308 is optically aligned with the laser pulse axis, and the second sensor 310 has an optical alignment difference of between 1 and 3 degrees from the laser pulse axis.

In a typical implementation the detector 306 is configured to operate as a relatively short range detector. And as will be described in greater detail below other detectors can be implemented to provide long range detection. To facilitate this, the first sensor 308 is implemented with optics to be focused at relatively short ranges. For example, the first sensor 308 can be implemented to be focused at a focal point between 2 and 6 meters from output lens of the scanning laser device and to have a depth of field of 4 meters. As one specific example, the sensor 308 can have a focal plane at 4 meters and a depth of field of 4 meters, to provide a focal working distance of 2-6 meters.

It should be noted that while the detector 306 includes a first sensor 308 and a second sensor 310, that in some embodiment the detector could include additional sensors. Furthermore, it should be noted that a variety of different types of devices can be implemented as the first sensor 308 and second sensor 310. For example, first sensor 308 and second sensor 310 can each be implemented with silicon photo multipliers (SiPM). In other embodiments the first sensor 308 and second sensor 310 can be implanted with photodiodes, including avalanche photodiodes and PIN photodiodes.

The first sensor 308 and second sensor 310 are coupled to cancellation circuit 314 and a detection circuit 316. In this embodiment the cancellation circuit 314 and detection circuit 316 together provide a sensing circuit for sensing objects in the scan field.

Specifically, the cancellation circuit 314 is coupled to both the first sensor 308 and the second sensor 310 and is configured to at least partially cancel the effects of back reflections received at the sensors to generate an output signal indicative of an object in the scan field. Specifically, the first sensor 308 and the second sensor 310 each generate outputs, and the cancellation circuit comprises a subtraction device configured to subtract an output of the second sensor 310 from an output of the first sensor 308. This results in a signal with reduced effects from back reflections. To further facilitate this, the cancellation circuit 314 can also include a first calibration circuit to calibrate the subtraction of the output of the second sensor 310 from the output of the first sensor 308.

The output the subtraction device is coupled to the detection circuit 316. In general, the detection circuit 316 determines when the output of the cancellation circuit 314 is above a threshold level that indicates the detection of a laser light pulse reflection from an object in the scan field. In one embodiment the detection circuit 316 includes a gain stage amplifier and a comparator. And in one embodiment, detection circuit 316 also includes a second calibration circuit to calibrate a threshold for detection of an object in the scan field. A detailed example of cancellation circuits and detection circuits shall be discussed in greater detail below with reference to FIG. 5

The short range sensor 312 is implemented to provide additional short range detection. Specifically, the short range sensor 312 provides for object detection at shorter ranges than are practical with the first sensor 308 and second sensor 310. For example, the short range sensor 312 can be configured with optics to be focused at a focal point less than 2 meters from the apparatus and to have a depth of field of 2 meters. As one specific example, the short range sensor 312 can have a focal plane at 1.1 meters and a depth of field of 2 meters, to provide a focal working distance of 0.1-2 meters.

Furthermore, in some embodiments the short range sensor 312 can be implemented with a different type of sensor that is more effective at very short range sensing. For example, in some embodiments the first sensor 308 and the second sensor 310 can be saturated and temporarily blinded by the strong reflections that are created by the presence of very close objects. This is especially true when the first sensor 308 and the second sensor 310 are implemented with relatively sensitive SiPM sensors. To address this issue the short range sensor 312 can be implemented with a photodiode or other type sensor that is not likely to be saturated by the presence of very close objects in the scan field. Thus, the short range sensor 312 can increase the reliability of object detection for very close objects (e.g., less than 1 meter), while the first sensor 308 and the second sensor 310 provide for the detection of objects in the less close ranges (e.g., between 1 and 6 meters).

Figure 4:
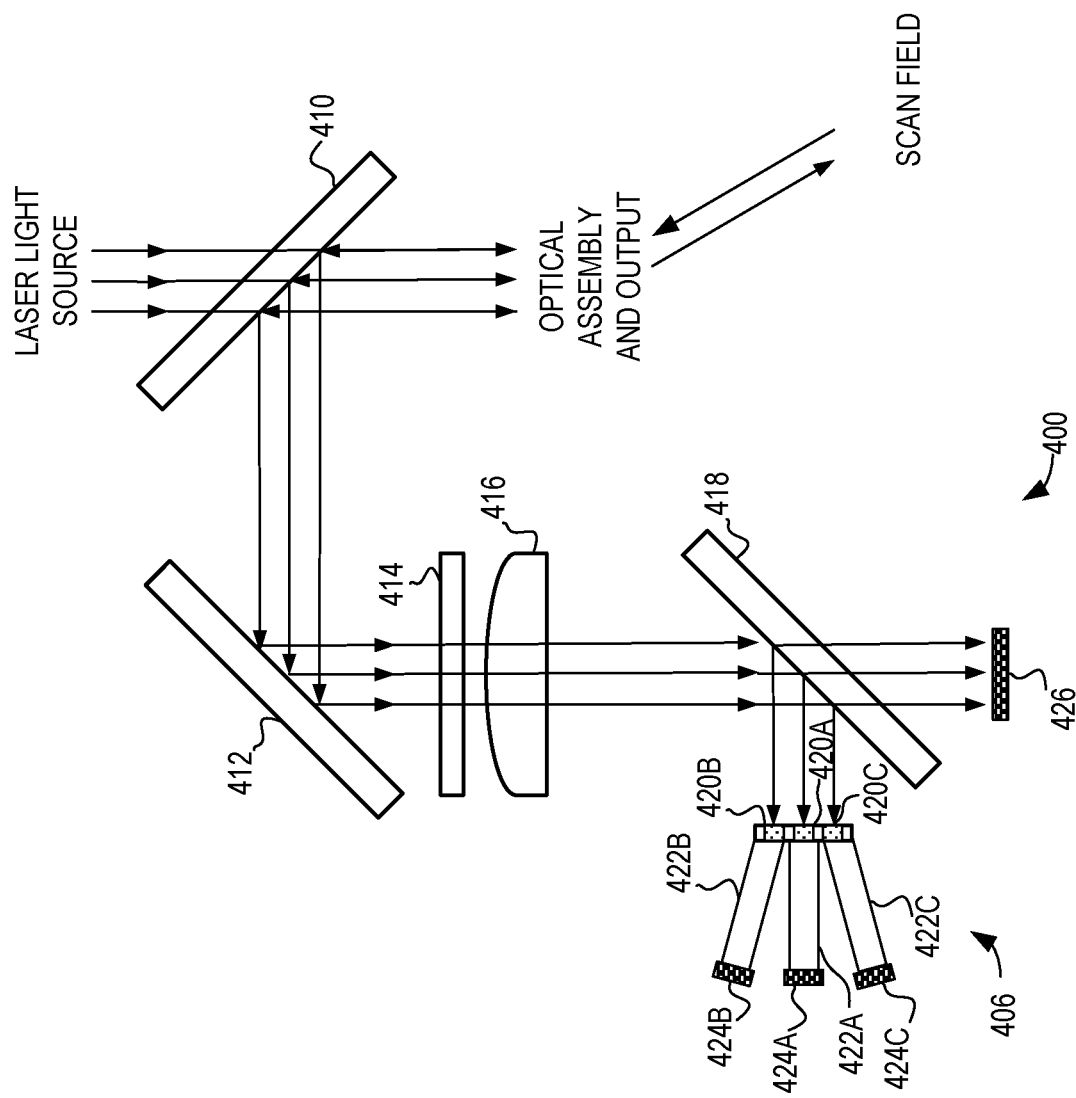
FIG. 4 shows a schematic view of an detector in accordance with various embodiments of the present invention.

Turning now to FIG. 4, a more detailed example of a portion of a scanning laser device 400 is illustrated. The portion of the scanning laser device 400 illustrated in FIG. 4 includes a detector 406. Not shown in FIG. 4 are the laser light sources and optical assembly (including any beam shaping optics, scanning mirrors, expansion optics, or output optics). As with the previous example, a laser light source generates pulses of laser light that are scanned by the scanning mirrors and other optical assembly elements into a scan field. The detector 406 is configured to receive reflections of the laser light pulses from objects within the scan field. These received reflections are used to detect those objects within the scan field and in some embodiments TOF measurements may be used to generate 3-dimensional point clouds that describe the depth of a surface at each point, and thus can be used to generate a depth map of the object surface.

The portion of the scanning laser device 400 illustrated in FIG. 4 includes a first beam splitter 410, a mirror 412, a band-pass filter 414, a focusing lens 416, a second beam splitter 418, apertures 420A-C, light pipes 422A-C, a first sensor 424A, a second sensor 424B, a third sensor 424C and a short range sensor 426.

In general, the first beam splitter 410 serves to direct reflections of laser light pulses returning from the scan field and direct those reflections into the detector 406. In one embodiment, the first beam splitter comprises a pick-off mirror with top and bottom portions that are coated to reflect laser light pulses into the detector 406, and a central portion that allows the laser light from the laser light source to pass through to the optical assembly. In other embodiments, the first beam splitter 410 is a partial reflector that transmits a portion of incident light and reflects the rest. In still further embodiments, the first beam splitter 410 may incorporate a polarizing beam splitter that transmits the pulsed laser beam (at a first polarization), and picks off received light of a different polarization.

The reflections from the scan field that are picked off by the first beam splitter 410 are directed to the mirror 412, where they are reflected to the band-pass filter 414 and the focusing lens 416. In general, the band-pass filter 414 is configured to filter out non-laser light and prevent it from reaching the sensors. For example, the band-pass filter 414 can be implemented to pass only light in the IR band to the sensors 424A-C.

The focusing lens 416 serves to image the scan field at a desired range onto the first sensor 424A. Specifically, reflections from objects in that range in the scan field will reflect off the second beam splitter 418 and be focused on the aperture 420A. Notably, back reflections from inside the optical assembly are not focused on aperture 420A and are thus spread across all three apertures 420A-C.

In general, the apertures 420A-C are provided to be the focal points of the lens 416. The apertures 420A-C then determine the field of view of the sensors 424A-C. This implementation allows the field of view of each of the sensors 424A-C to be separately defined in vertical and horizontal.

In one implementation the first aperture 420A is smaller than the other two apertures 420B-C to get better averaging of scatter over sensors 424B-C. Specifically, the larger apertures 420B-C provide a larger field of view and are thus less sensitive to small changes in back reflection.

The light pipes 422A-C are implemented to direct received light to the respective sensors while causing the received light to expand and fill the sensing areas of the sensors 424A-C. This can increase the effective dynamic range of the sensors 424A-C. As one example, the light pipes 422A-C can be implemented with any suitable optical plastic.

In one specific implementation, the focusing lens 416 is implemented to have a working distance of 2-6 meters from the device. Thus, reflections from objects within that working distance will reflect off the second beam splitter 418 and be focused on the aperture 420A. Those focused reflections received at the aperture 420A will expand and be guided through the light pipe 422A to the sensing area of the first sensor 424A. Thus, the first sensor 424A is optically aligned with the laser light pulses reflecting from surfaces a selected range between 2 and 6 meters though the arrangement of the focusing lens 416, second beam splitter 418, aperture 420A and light pipe 422A.

Notably, the apertures 420B-C, the light pipes 422B-C, and the second sensor 424B and third sensor 424C are not optical aligned with the laser light pulses at those ranges, and thus will not receive significant reflections from the scan field. For example, the second sensor 424B and third sensor 424C can have an optical alignment difference compared to the first sensor 424A such that the second sensor 424B and third sensor 424C each receives less than 10 percent of the reflected energy from objects in the scan field compared to the first sensor 424A. In another embodiment, the second sensor 424B and third sensor 424C can have an optical alignment difference compared to the first sensor 424A such that the second sensor 424B and third sensor 424C each receives less than 5 percent of the reflected energy from objects in the scan field received by the first sensor 424A. In one example the apertures 420B-C and sensors 424B-C can each have an optical alignment difference of between 1 and 3 degrees compared with the aperture 420A and sensor 424A to facilitate this result. In such an embodiment this optical alignment difference is caused by different locations of the apertures 420B-C relative to the lens axis of lens 416. Likewise, the field of view size of the sensors 424B-C is determined by the size of the apertures 420B-C.

However, back reflections from inside the optical assembly (including reflections from any beam shaping optics, scanning mirrors, expansion optics, or output optics) are not focused the apertures 420A-C and thus the back reflections are spread across all three apertures 420A-C. Thus, all three sensors 422A-C will receive back reflections, although not necessarily in equal amounts. Stated another way, back reflections are coming from objects outside of the working distance, so are not in focus at the apertures 420A-C, and are instead blurred over all of the apertures 420A-C.

The short range sensor 426 is implemented to provide sensing at a shorter range than sensors 424A-C. As one example, the short range sensor 426 is implemented to have working distance of 0.1-2 meters.

The second beam splitter 418 is implemented as a near-far beam splitter such that light reflecting from very close objects (e.g., objects closer than 2 meters) passes through the second beam splitter 418 to short range sensor 426 while light reflecting from farther objects (e.g., objects between 2 and 6 meters) is reflected toward the apertures 420A-C. For example, the second beam splitter 418 can be implemented with a dielectric coating that reflects 90 percent of incident light and transmits 10 percent of incident light.

In one embodiment, the first sensor 424A, second sensor 424B, and third sensor 424C are implemented with SiPM's to facilitate high sensitivity while the short range sensor 426 is implemented with a photodiode to avoid oversaturation caused by very close objects.

So configured, the first sensor 424A, second sensor 424B, and third sensor 424C are configured to facilitate the at least partially cancellation of the effects of back reflections from within the optical assembly. Specifically, the first sensor 424A is configured to receive reflections of the laser light pulses from objects within the scan field and to further receive back reflections of the laser light pulses from elements within the optical assembly. The second sensor 424B and third sensor 424C are configured to receive back reflections of the laser light pulses from within the optical assembly while not receiving significant reflections from objects within the scan field. Thus, all three sensors 424A-C are configured to receive back reflections from within the optical assembly, while only the first sensor 424A receives significant reflections from objects within the scan field.

The various sensors 424A-C and 426 are coupled to a sensing circuit for sensing objects in the scan field. The sensing circuit includes a cancellation circuit to at least partially cancel the effects of back reflections received at the sensors to generate an output signal indicative of an object in the scan field. In one example, the cancellation circuit comprises subtraction device(s) configured to subtract outputs of the second and third sensors 424B-C from the output of the first sensor 424A. This results in a signal with reduced effects from back reflections. The output of the cancelation circuit can be passed to a detection circuit. Likewise, the output of the short range sensor 426 is passed to the detection circuit. The detection circuit can then determine when the output of the cancellation circuit or the output of the short range sensor 426 indicates the detection of a laser light pulse reflection from an object in the scan field.

Figure 5:
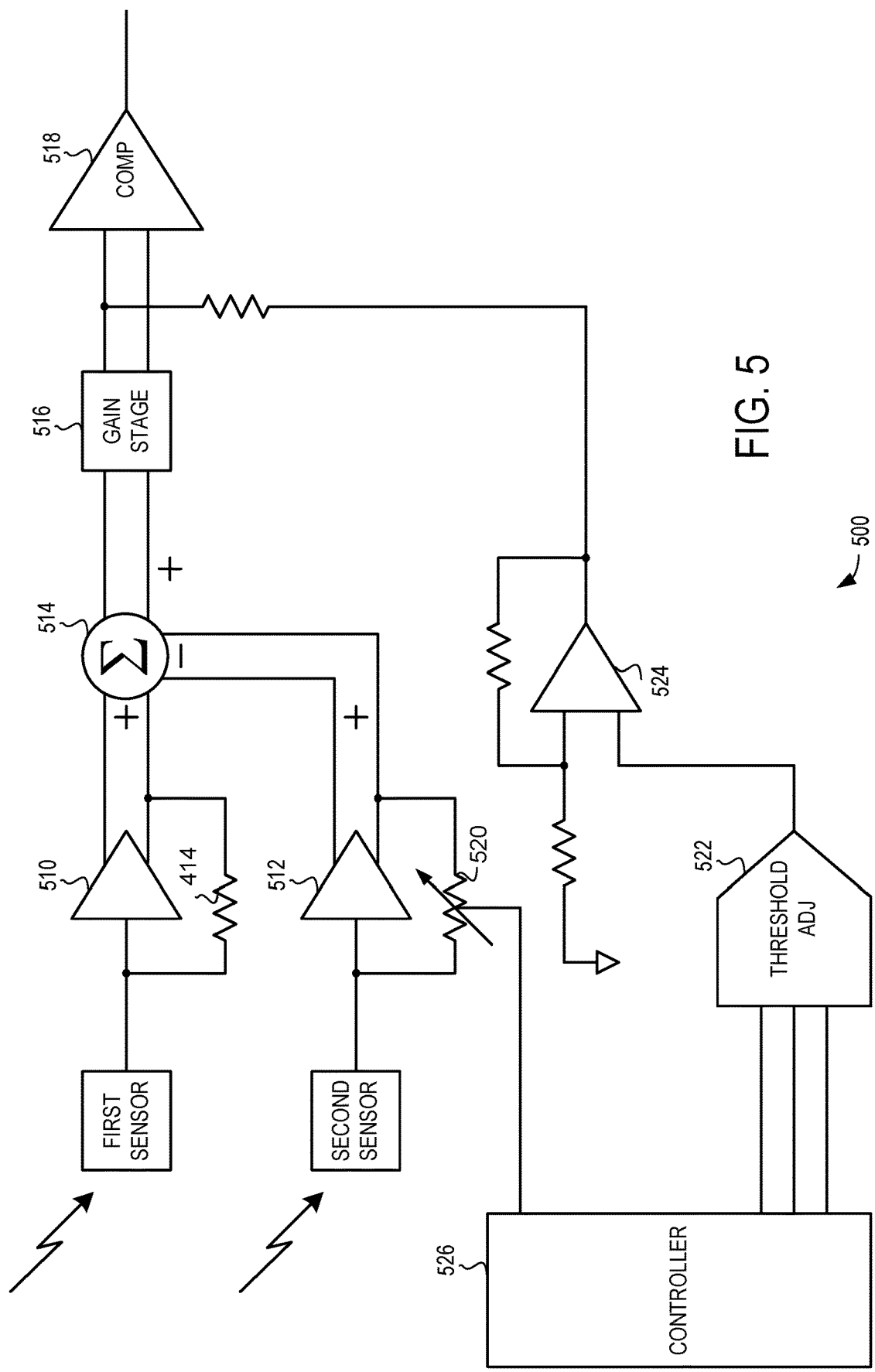
FIG. 5 shows a circuit view of sensing circuit in accordance with various embodiments of the present invention.

Turning now to FIG. 5, a detailed circuit diagram view of an exemplary sensing circuit 500 is illustrated. In general, the sensing circuit 500 provides a cancellation circuit, detection circuit, and calibration circuits used in an exemplary scanning laser device (e.g., scanning laser device 100). The sensing circuit 500 illustrated in FIG. 5 includes transimpedance amplifiers (TIA) 510 and 512, subtraction device 514, gain stage amplifier 516, comparator 518, variable impedance 520, threshold adjuster 522 and amplifier 524. The inputs of the transimpedance amplifiers 510 and 512 are coupled to the outputs of the first sensor and second sensor respectively. A controller 526 provides control signals to the variable impedance 520 and threshold adjuster 522. The output of the comparator 518 provides the output of the sensing circuit 500 and can be coupled any device that utilizing detected reflections, including time-of-flight (TOF) circuits, short range detection circuits, virtual protective housing circuits, etc.

The sensing circuit 500 is coupled to a first sensor and a second sensor. As described above, the first sensor and second sensor can be implemented silicon photo multipliers (SiPM), photodiodes, or any other suitable sensing device. Such sensors typically are configured to generate output signals with a current that is proportional to the photon energy for received light of particular wavelengths. For example, these sensors can be implemented to generate output signals with a current proportional to the photo energy of IR light. These sensors can be implemented with suitable bias voltage circuits to control operation of the sensors.

As was described above, in one embodiment the first sensor has a first sensor field of view that is optically aligned with the laser light pulses that are scanned into the scan field. As such, the first sensor will receive reflections of the laser light pulses from objects within the scan field through the optical assembly and will further receive back reflections of the laser light pulses from elements within the optical assembly. In response the first sensor generates a first sensor output signal proportional to the reflected energy in the received reflections from within the scan field plus the reflected energy in the received back reflections. Conversely, the second sensor has a second field of view that is not optically aligned with the laser light pulses scanned into the scan field. As such, the second sensor will receive back reflections of the laser light pulses from within the optical assembly while not receiving significant reflections from objects within the scan field. In response, the second sensor generates a second sensor output signal proportional to the reflected energy in the received back reflections.

During operation of the sensing circuit 500, the first sensor output signals coupled to the first transimpedance amplifier 510, which converts the output signal from a current signal to a voltage signal. Likewise, second sensor output signals from the second sensor are coupled to the second transimpedance amplifier 512, which again converts the output signal from a current signal to a voltage signal. In each case the gain of conversion is determined in part by the associated impedance of the transimpedance amplifier. Thus, the gain of the conversion for the second transimpedance amplifier 512 is determined in part by the state of the variable impedance 520.

The voltage signal outputs of the transimpedance amplifiers 510 and 512 are passed to the subtraction device 514. The subtraction device 514 combines the two voltage signals by subtracting the output signal of amplifier 512 from the output signal of amplifier 510. As was described above, because of the configuration of the first sensor and second sensor this subtraction generates a resulting signal where the effects of back reflections have been reduced by at least partially canceling the effects from the resulting signal.

The resulting signal is passed to the gain stage amplifier 516 for amplification. The amplified signal is passed to the comparator 518, which compares the amplified signal to a threshold value to generate a digital pulse signal that is asserted when the amplified signal is beyond the threshold and not asserted otherwise. As will be described in greater detail below, the threshold value used in this conversion can be determined during a calibration.

As noted above, the variable impedance 520 controls the gain of conversion of the second sensor output signal, and thus can be used to calibrate the cancellation of the effects of back reflection from the sensing output of the first sensor. In some embodiments this calibration can be performed once at the factory or during initial set up. For example, this calibration can be performed during an initial calibration setup when it is known that no objects are in the sensing region, such that all light received at both sensors is the result of back reflections from within the optical assembly. In other embodiments the calibration can be repeated as desired.

Likewise, the threshold adjuster 522 and amplifier 524 are used to calibrate the threshold value used by the comparator 518 to generate digital pulse signals. Again, in some embodiments this calibration can be performed once during initial set up. In other embodiments this calibration can be repeated as needed. For example, this calibration can be repeated to adjust the threshold value for different levels of ambient light or dirt on the sensor.

In one specific example, during an initial calibration the gain of the conversion of the second sensor output signal is set minimize the signal that is going into the gain stage 516 and into the comparator 518 to cancel the result of back reflection from the output of the first sensor. This allows for the threshold value of the comparator 518 to be set relatively low and thus provide a high level of sensitivity. Then during use the threshold can be adjusted for changes in ambient light and other conditions. Thus, the two calibrations can together provide for high sensitivity and changing conditions.

It should be noted that while the sensing circuit 500 shows amplifiers being coupled to only two sensors that the circuit 500 can be expanded for implementations with additional sensors. For example, a third sensor can also be implemented to detect back reflections (e.g., the third sensor 424C of FIG. 4). In that application a third transimpedance amplifier with a variable impedance can be used to convert the output of the third sensor, and the converted output of the third sensor would also be subtracted from the output of the first sensor at the subtraction device 514 or other subtraction device.

Additionally, the sensing circuit 500 can be expanded to receive output signals from a short range sensor (e.g., short range sensor 426 in FIG. 4) in a separate channel. This separate channel would typically not generate signals that are subtracted from the output of the first sensor. Instead, this separate channel would typically include its own amplifiers, gain stage and comparator to provide independent detection.

Figure 6:
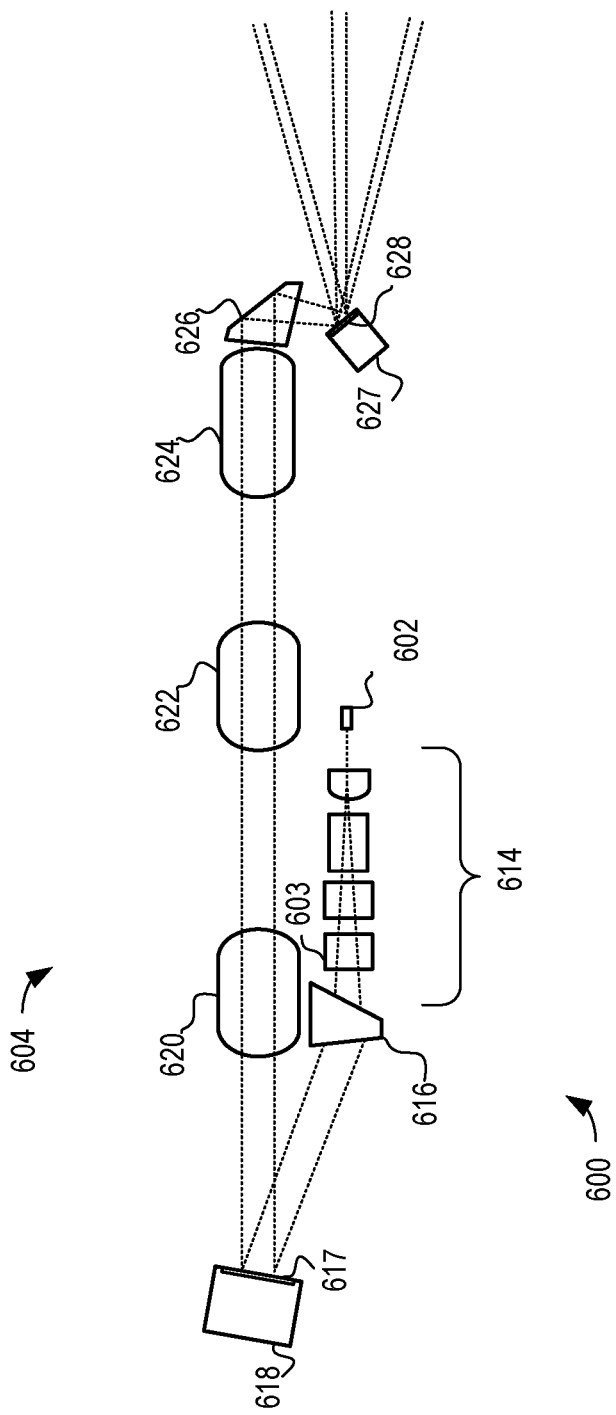
FIGS. 6 and 7 show side and top views of a scanning laser device in accordance with various embodiments of the present invention.
Figure 7:
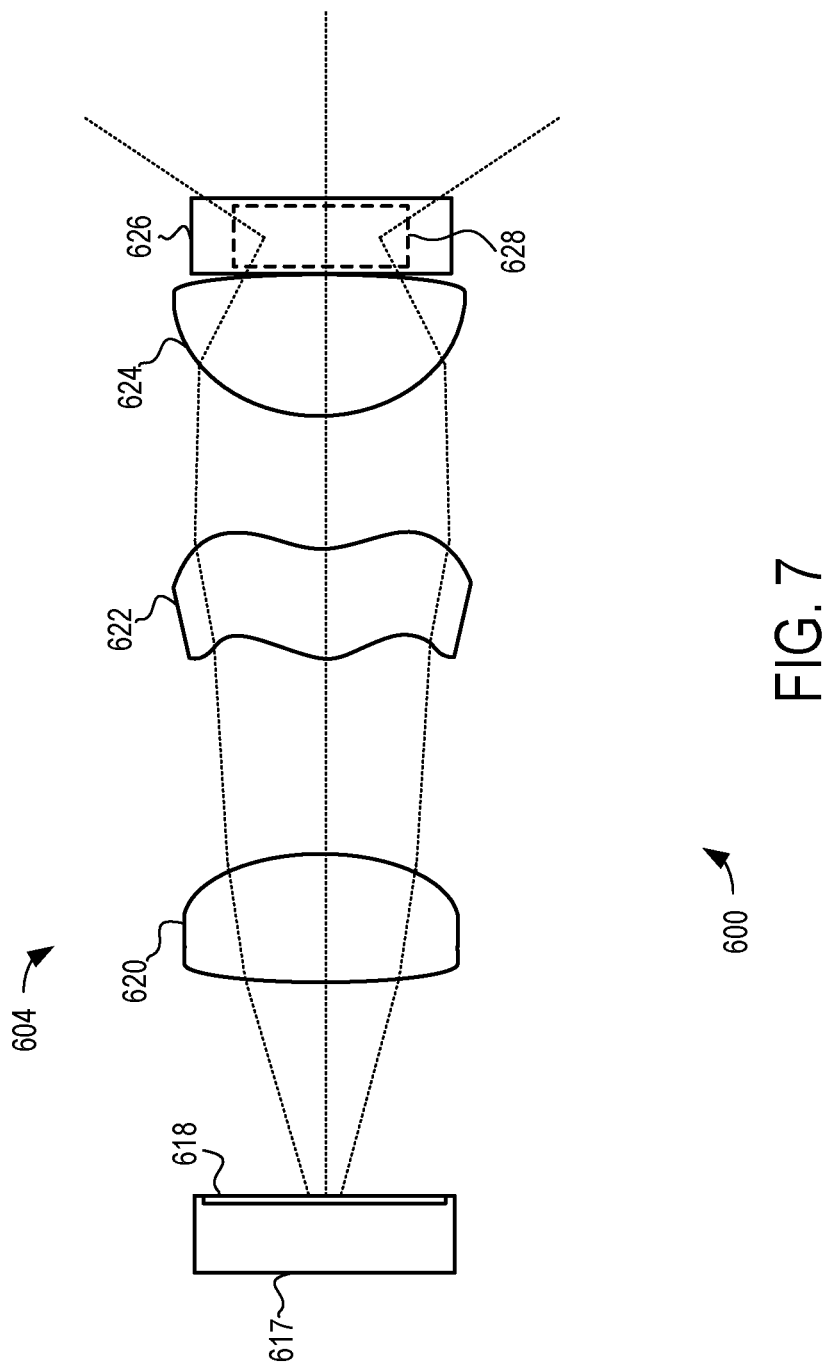

Turning now to FIGS. 6 and 7, side and top views of a scanning laser device 600 are illustrated. In one embodiment, the scanning laser device 600 is a light LiDAR system used for object detection and/or 3D map generation. The scanning laser device 600 includes a laser light source 602 and an optical assembly 604. The optical assembly 604 is one example of the type of optical assembly that can be used in a LiDAR or other scanning laser device (e.g., scanning laser device 100) in accordance with the embodiments described herein. As such, the optical assembly 604 includes a variety of optical elements used to facilitate scanning. It should be noted that FIGS. 6 and 7 are simplified examples, and thus do not show all of the elements or features of a fully implemented scanning laser device or optical assembly.

The optical assembly 604 illustrated in FIG. 2 includes beam shaping optics 614, a first prism 616, a first scanning mirror assembly 617, first scanning mirror(s) 618, expansion optics that include three expansion lenses 620, 622, 624, a second prism 626, a second scanning mirror assembly 627, and second scanning mirror(s) 628.

During operation of scanning laser device 600 the laser light source 602 generates laser light pulses that are scanned by the optical assembly 604 into a scan trajectory (e.g., pattern 112) over a scan field (e.g., scan field 114). For example, the laser light source 602 can comprise one or more infrared (IR) lasers driven by field effect transistors (FETs) to generate IR laser light pulses.

In general, pulses from multiple IR laser light sources are first combined and shaped by the beam shaping optics 614 and associated optical elements. The beam shaping optics 614 can thus include any optics for changing the beam shape of the laser light pulses. For example, the beam shaping optics 614 can include collimating lenses, polarizing combiners, anamorphic prism pairs to improve divergence and other such elements. In one embodiment a pick-off beam splitter or prism 603 is implemented within the beam shaping optics 614 to direct reflections to the detector (not shown in FIGS. 5 and 6) configured for short range pulse detection. The detector can be implemented as any of the embodiments described above (e.g., detector 106, 306, 406). In one specific embodiment the pick-off beam splitter or prism 603 corresponds to the first beam splitter 410 illustrated in FIG. 4, and the detector corresponds to detector 406.

The output of the beam shaping optics 614 is passed to first prism 616 that kicks the beams up to the first scanning mirror 618. In this illustrated embodiment, the first scanning mirror 618 provides for horizontal scanning motion, while the second scanning mirror 628 provides for vertical scanning motion. Furthermore, in this example the first scanning mirror 618 is driven to provide the scanning motion at a relatively slow scan rate, while the second scanning mirror 628 is driven to provide motion at a a relatively slow scan rate. However, these are just examples, and other implementations are possible. Together, this scanning mirror motion results in the laser light pulses being scanned into scan trajectory pattern (e.g., pattern 112). It again should be noted labels "vertical" and "horizontal" used herein are somewhat arbitrary, since a 90 degree rotation of the scanning laser device will effectively switch the horizontal and vertical axes.

The output of the first scanning mirror 618 is passed to the three expansion lenses 620, 622, 624 which together provide the expansion optics. In general, the expansion optics are implemented to provide an expansion of the scan field in the horizontal direction.

Specifically, in this illustrated example the three expansion lenses 620, 622, 624 are implemented to image the output of the first scanning mirror 618 onto the second scanning mirror 628 while providing a non-uniform expansion in the horizontal direction. As one specific example, the first scanning mirror 618 can be implemented to provide a scanning angle in the horizontal direction of 40 degrees, and the expansion lenses 620, 622, 624 can be implemented to provide a non-uniform expansion to expand the scanning angle to 110 degrees.

As noted above, the expansion lenses 620, 622, 624 can be implemented to provide a non-uniform horizontal expansion. In general, the non-uniform expansion is one where the expansion optics provides a non-uniform variation in optical expansion relative to position along a first axis of the IR laser light pulses in the scan field. For example, the amount of expansion can increase or decrease non-uniformly along the horizontal axis.

In one specific example, the three expansion lenses 620, 622, 624 implement a 4F optical system that images the output of the first scanning mirror 618 onto the second scanning mirror 628. Specifically, the three expansion lenses 620, 622, 624 provide a 4F optical system with magnification that varies with the angle coming from the first scanning mirror 618. The result of these three expansion lenses 620, 622, 624 is a non-uniform variation in optical expansion of the exit scan angle provided by the first scanning mirror 618. The second prism 626 receives the output of the third expansion lens 624 and directs the beams to the second scanning mirror 628.

As describe above, one issue during operation of a scanning laser device is that the various elements inside the optical assembly 604 may generate unwanted back reflections. For example, back reflections in the form of both specular and scattered back reflections can be created when the laser beam pulses impact the beam shaping optics 614, first prism 616, the first scanning mirror 618, the three expansion lenses 620, 622, 624, the second prism 626 and the second scanning mirror 628. In each case a portion of the unwanted back reflections can be reflected back to the detector and interfere with the detection of low energy reflections from objects within the scan field.

The embodiments described herein provide detectors (e.g., detector 106, 306, 406) that use multiple sensors to at least partially cancel the effects of these back reflections. The use of a detector that uses multiple sensors, where the multiple sensors receive reflections through the same optical assembly 604 that is used to also scan the laser light pulses, and where the multiple sensors are used to at least partially cancel the effects of back reflections, can thus improve both the sensitivity and reliability of laser light detection in scanning laser devices. Furthermore, this combination of features can be used to facilitate the use of low energy light pulses and a short range detection mode that can provide increased laser safety in a variety of scanning laser device applications.

Figure 8:
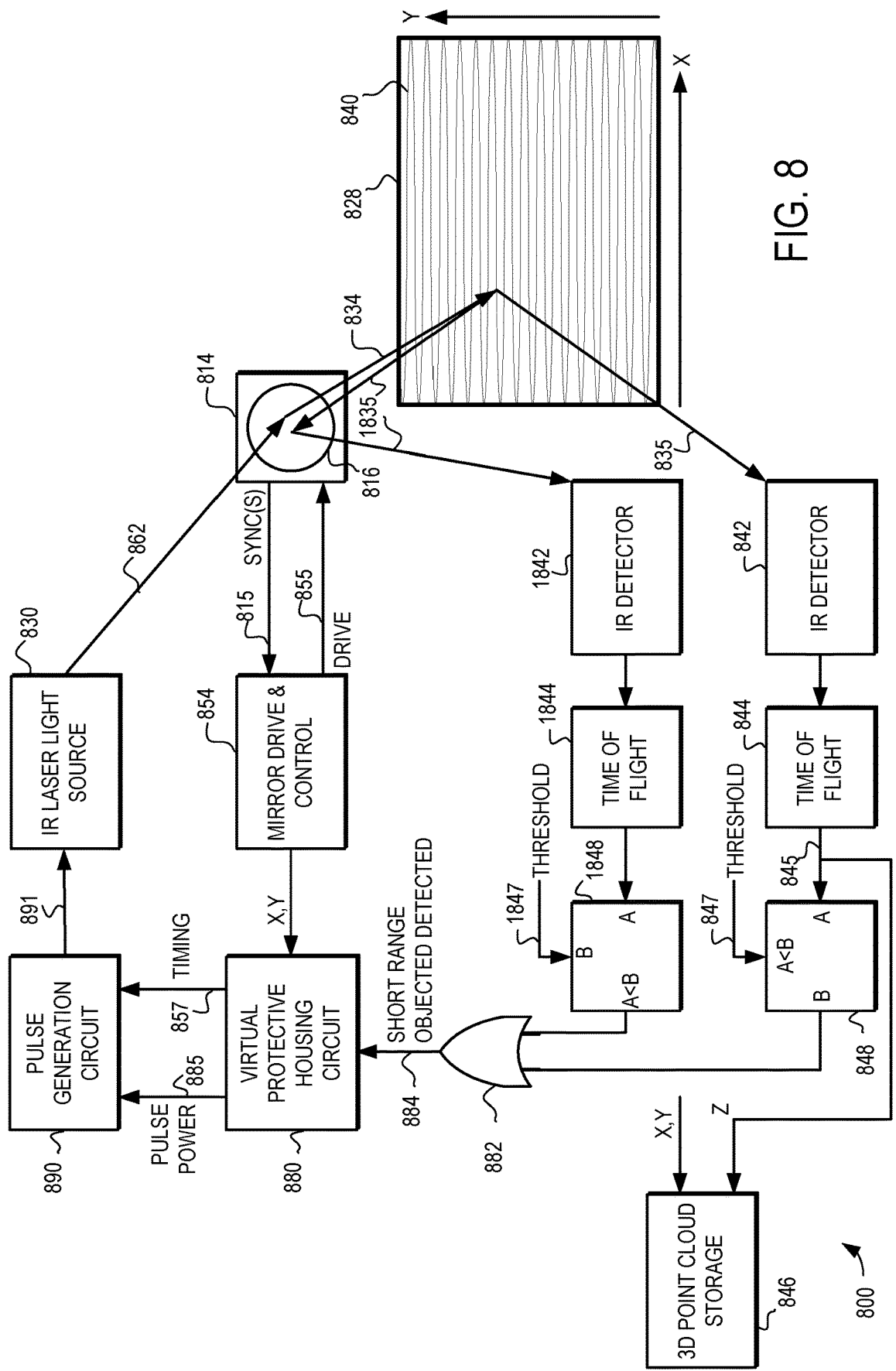
FIG. 8 shows a schematic view of a LiDAR system in accordance with various embodiments of the present invention.

Turning now to FIG. 8, a scanning light detection and ranging (LiDAR) system 800 in accordance with various embodiments is illustrated. The LiDAR system 800 is another example of the type of scanning laser device that can be implemented in accordance with the embodiments described herein. System 800 includes pulse generation circuit 890, infrared (IR) laser light source 830, scanning mirror assembly 814 with scanning mirror(s) 816, and mirror drive and control circuit 854. System 800 also includes first infrared (IR) detector 842, first time-of-flight (TOF) measurement circuit 844, 3D point cloud storage circuit 886, first comparator 848, and virtual protective housing circuit 880. System 800 also includes second IR detector 1842, second TOF measurement circuit 1844, and second comparator 1848. As will be described in greater detail below, the second IR detector 1842 can be implemented to provide redundant short range detection. And in accordance with the embodiments described herein this second IR detector 1842 can be implemented with multiple sensors to at least partially cancel the effects of back reflections from with the optical assembly that includes scanning mirror(s) 816.

Laser light source 830 may be a laser light source such as a laser diode(s) or the like, capable of emitting a laser beam pulses 862. The beam pulses 862 impinge on a scanning mirror assembly 814 which in some embodiments is part of a microelectromechanical system (MEMS) based scanner or the like, and reflects off of scanning mirror 816 to generate controlled output beam pulses 134. In some embodiments, optical elements are included in the light path between laser light source 830 and mirror(s) 816. For example, system 800 may include collimating lenses, dichroic mirrors, expansion optics, or any other suitable optical elements. And as was described above, the scanning mirrors, expansion optics, and other elements can cause back reflections of laser light pulses toward the second IR detector 1842 during operation of the system 800.

A scanning mirror drive and control circuit 854 provides one or more drive signal(s) 855 to control the angular motion of scanning mirror(s) 816 to cause output beam pulses 134 to traverse a scan trajectory 840 in a scan field 828. In operation, laser light source 830 produces modulated light pulses in the nonvisible spectrum and scanning mirror(s) 816 reflect the light pulses as beam 834 traverses scan trajectory 840.

In some embodiments, scan trajectory 840 is formed by combining a sawtooth component on the horizontal axis and a sinusoidal component on the vertical axis. In still further embodiments, the horizontal sweep is also sinusoidal. The various embodiments of the present invention are not limited by the waveforms used to control the vertical and horizontal sweep or the resulting scan trajectory pattern. One axis (e.g., horizontal) is the slow scan axis, and the other axis is the fast-scan axis.

Although scanning mirror(s) 816 are illustrated as a single mirror that scans in two axes, this is not a limitation of the present invention. For example, in some embodiments, mirror(s) 816 is implemented with two separate scanning mirrors, one scanning in one axis, and a second scanning in a second axis.

In some embodiments, scanning mirror(s) 816 include one or more sensors to detect the angular position or angular extents of the mirror deflection (in one or both dimensions). For example, in some embodiments, scanning mirror assembly 814 includes a piezoresistive sensor that delivers a voltage that is proportional to the deflection of the mirror on the fast-scan axis. Further, in some embodiments, scanning mirror assembly 814 includes an additional piezoresistive sensor that delivers a voltage that is proportional to the deflection of the mirror on the slow-scan axis. The mirror position information is provided back to mirror drive and control circuit 854 as one or more SYNC signals 815. In these embodiments, mirror drive and control circuit 854 includes one or more feedback loops to modify the drive signals in response to the measured angular deflection of the mirror. In addition, in some embodiments, mirror drive and control circuit 854 includes one or more phase lock loop circuits that estimate the instantaneous angular position of the scanning mirror based on the SYNC signals.

Mirror drive and control circuit 854 may be implemented using functional circuits such as phase lock loops (PLLs), filters, adders, multipliers, registers, processors, memory, and the like. Accordingly, mirror drive and control circuit 854 may be implemented in hardware, software, or in any combination. For example, in some embodiments, control circuit 854 is implemented in an application specific integrated circuit (ASIC). Further, in some embodiments, some of the faster data path control is performed in an ASIC and overall control is software programmable.

The system 800 includes two separator IR detectors, TOF measurement circuits and comparators for detecting IR laser pulses. Specifically, the system 800 includes a first IR detector 842 and a second IR detector 1842. In general, the first IR detector 842 is implemented to detect reflections from both short range and long range pulses, while the second IR detector provides for the redundant detection of reflections from low power short range pulses to provide increased eye safety.

First IR detector 842 includes one or more photosensitive devices capable of detecting reflections of IR laser light pulses. For example, first IR detector 842 may include one or more PIN photodiodes, Silicon photomultipliers (SiPM), avalanche photodiodes (APD), or the like. Each point in the field of view that is illuminated with an IR laser light pulse (referred to herein as a "measurement point") may or may not reflect some amount of the incident light back to first IR detector 842. If first IR detector 842 detects a reflection, IR detector 842 provides a signal 843 to first TOF measurement circuit 844.

First TOF measurement circuit 844 measure times-of-flight (TOF) of IR laser light pulses to determine distances to objects in the field of view. In some embodiments, virtual protective housing circuit 880 provides a timing signal (not shown) corresponding to the emission time of a particular IR laser light pulse to first TOF measurement circuit 844, and first TOF measurement circuit 844 measures the TOF of IR laser light pulses by determining the elapsed time between the emission of the pulse and reception of the reflection of the same pulse.

First TOF measurement circuit 844 may be implemented using any suitable circuits. For example, in some embodiments, first TOF measurement circuit 844 includes an analog integrator that is reset when the IR pulse is launched, and is stopped when the reflected pulse is received. First TOF measurement circuit 844 may also include an analog-to-digital converter to convert the analog integrator output to a digital value that corresponds to the time-of-flight (TOF) of the IR laser pulse, which in turn corresponds to the distance between system 800 and the object in the field of view from which the light pulse was reflected.

3D point cloud storage device 846 receives X,Y data from mirror drive and control circuit 854, and receives distance (Z) data on node 845 from first TOF measurement circuit 844. A three-tuple (X,Y,Z) is written to 3D point cloud storage device for each detected reflection, resulting in a series of 3D points referred to herein as a "point cloud." Not every X,Y measurement point in the field of view will necessarily have a corresponding Z measurement. Accordingly, the resulting point cloud may be sparse or may be dense. The amount of data included in the 3D point cloud is not a limitation of the present invention.

3D point cloud storage device 846 may be implemented using any suitable circuit structure. For example, in some embodiments, 3D point cloud storage device 846 is implemented in a dual port memory device that can be written on one port and read on a second port. In other embodiments, 3D point cloud storage device 846 is implemented as data structures in a general purpose memory device. In still further embodiments, 3D point cloud storage device 846 is implemented in an application specific integrated circuit (ASIC).

First comparator 848 compares the distance data (Z) on node 845 to a threshold value, and if the distance is less than the threshold value, then first comparator 848 asserts the short range object detection signal on the input to OR gate 882. The short range object detection signal passes through OR gate 882 to the VPH circuit 880 to indicate the detection of an object within a "short range," where "short range" is determined by the value of the threshold on node 847. For example, if the threshold is set to a value corresponding to a distance of five meters, and the detected distance is lower than that threshold, then an object closer than five meters has been detected, and VPH circuit 880 will be notified by the short range object detection signal on node 884.

The threshold value at node 847 and the corresponding short range distance may be modified by VPH circuit 880 based on any criteria. For example, the threshold may be a function of IR laser pulse power, pulse duration, pulse density, wavelength, scanner speed, desired laser safety classification, and the like. The manner in which the threshold value is determined is not a limitation of the present invention.

The second IR detector 1842, second TOF measurement circuit 1844, and second comparator 1848 operate to provide a redundant short range object detection capability. Redundant short range object detection provides an additional measure of safety. For example, if one or the IR detectors, TOF measurement circuits, or comparators should fail, the redundancy will ensure continued safe operation.

Notably, the first IR detector 842 and the second IR detector 1842 receive reflected light pulses through different optical paths. Specifically, the first IR detector 842 receives reflected light along a separate path shown at 835 while the second IR detector 1842 shares at least part of an optical path with the emitted light pulses. Specifically, the reflected light from the scan field is reflected back through at least some of the mirror(s) 816, expansion optics, and other elements in the optical assembly to reach second IR detector 1842 along path 1835.

The second TOF measurement circuit 1844 measure times-of-flight (TOF) of IR laser light pulses to determine distances to objects in the field of view in a manner similar to that of the first TOF measurement circuit 844. Thus, the second TOF measurement circuit 1844 may be implemented using any suitable circuits as with the first TOF measurement circuit 844.

Likewise, the second comparator 1848 compares the distance data (Z) on node 845 to a threshold value, and if the distance is less than the threshold value, then second comparator 1848 asserts the short range object detection signal on the input to OR gate 882. Again, this short range object detection signal passes through OR gate 882 to the VPH circuit 880 to indicate the detection of an object within a "short range," where "short range" is determined by the value of the threshold on node 1847. For example, if the threshold is set to a value corresponding to a distance of five meters, and the detected distance is lower than that threshold, then an object closer than five meters has been detected, and VPH circuit 880 will be notified by the short range object detection signal on node 884.

Again, the threshold value at node 1847 and the corresponding short range distance may be modified by VPH circuit 880 based on any criteria. For example, the threshold may be a function of IR laser pulse power, pulse duration, pulse density, wavelength, scanner speed, desired laser safety classification, and the like.

In some embodiments, both of the detection and TOF measurement circuits operate to detect short range objects, and only one of the detection and TOF measurement circuits operate to measure long range distance and/or write to the 3D cloud storage device. For example, in embodiments represented by FIG. 8, times-of-flight measured by either TOF measurement circuit 1844 or TOF measurement circuit 1844 may be used to detect a short range object, but only times-of-flight measured by TOF measurement circuit 844 are used to populate the 3D point cloud.

VPH circuit 880 operates to manage accessible emission levels in a manner that allows overall operation to remain eye-safe. For example, in some embodiments, VPH circuit 880 controls whether a "short range pulse" or "long range pulse" is generated by setting a pulse energy value on node 885. The emitted pulse energy may be controlled by one or more of pulse power, pulse duration, or pulse count.

VPH circuit 880 may also control the timing of emitted pulses via the timing signal on node 857. In some embodiments, for every measurement point in the field of view, VPH circuit 880 signals pulse generation circuit 890 to generate a short range pulse that can detect objects with a very high level of confidence out to a distance sufficient to provide a virtual protective housing. As used herein, the term "short range pulse" refers to a pulse that is considered eye-safe at a very short range. For example, in some embodiments, the energy levels of the short range IR laser light pulses may be maintained below the IEC 60825.1 Class 1 Accessible Emissions Limit, such that short range IR laser light pulses can be emitted at every measurement point without risking injury to a human eye.

If an object is detected within the short range distance, the corresponding three-tuple (X,Y,Z) may be written to the 3D point cloud storage device 846, and system 800 provides a virtual protective housing by not emitting any higher energy pulses at that measurement point. If, however, a short range object is not detected, system 800 may emit one or more "long range pulses" that are of higher total energy to detect objects beyond the short range distance. For example, in some embodiments, system 800 may emit a short range IR laser light pulse that is considered eye-safe at a distance of 100 millimeters (mm) that has a 50% probability of detecting a 5% reflective target at 36 meters (m) in bright sunlight. This short range pulse may have a one in 10 billion probability of not detecting a 10% reflective target at a distance of 12 m. Also for example, system 800 may emit a long range pulse capable of detecting objects up to 200 m distant while remaining eye-safe beyond four meters distance. In this example, system 800 may emit short range pulses that have an extremely high probability of detecting objects within four meters, and then emit long range pulses that are capable of detecting objects at 200 m.

As used herein, the term "long range pulse" refers to one or more pulses with higher total energy than short range pulses. For example, in some embodiments, a single long range pulse may be emitted, and the single long range pulse may have higher energy than a single short range pulse, and in other embodiments, multiple long range pulses may be emitted, and the total energy of the multiple long range pulses may be higher than the single short range pulse.

Virtual protective housing circuit 880 may be implemented using any suitable circuit structures. For example, in some embodiments, VPH circuit 880 may include one or more finite state machines implemented using digital logic to respond to short range object detection and conditionally signal pulse generation circuit 890 to emit long range pulses. Further, in some embodiments, VPH circuit 880 may include a processor and memory to provide software programmability of short range pulse energy, long range pulse energy, threshold values and the like. The manner in which VPH circuit 880 is implemented is not a limitation of the present invention.

Figure 9:
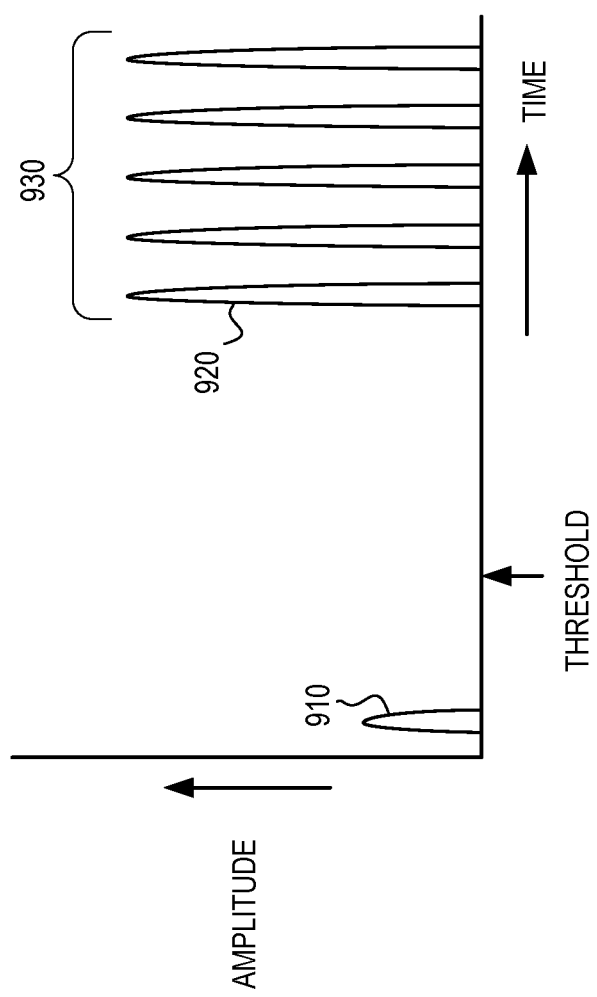
FIG. 9 shows short and long range pulses in accordance with various embodiments of the present invention.

Turning now to FIG. 9, short and long range pulses in accordance with various embodiments of the present invention are illustrated. Short range pulse 910 and long range pulses 930 are examples of IR laser light pulses that may be emitted by a LiDAR (system 800) or other scanning laser device (e.g., scanning laser device 100) at each measurement point. For example, the system may emit short range pulse 910 and then conditionally emit one or more of long range pulses 930 based on whether a short range object is detected. Pulse amplitude is shown on the vertical axis and time is shown on the horizontal axis of the plot in FIG. 9. Short range pulse 910 is shown being emitted at a first time and a threshold is shown representing a second time. The difference between the first and second times represents the short range distance. For example, in some embodiments, the threshold is set at approximately 33 nanoseconds (ns) corresponding to a short range distance of substantially five meters. In some embodiments, short range pulse 910 has an energy level that is considered eye-safe at a very short distance. For example, short range pulse 910 may be eye-safe at 100 mm from the system 800 from which it is emitted.

In some embodiments, if a short range object is detected, the system does not emit any long range pulses for that measurement point, and the detected distance is written to the 3D point cloud. On the other hand, if a short range object is not detected, one or more long range pulses 930 is emitted in a manner that maintains accessible emissions at an eye-safe level. For example, short range pulse 910 may have an energy level that provides a very high probability of detecting an object within the short range distance, and long range pulse 920 may have a total energy level that is eye-safe at the short range distance and beyond. Long range pulses can follow shortly after the threshold time if no short range object is detected. For example, long range pulse 920 may be emitted within 100 ns of the threshold time, or at 133 ns. The times corresponding to the threshold and emission of long range pulses may be different in various embodiments based on the desired short range distance and processing times, and are not a limitation of the present invention.

In some embodiments, a single long range pulse 920 is emitted, and in other embodiments a train of long range pulses 930 is emitted for each measurement point. The number of long range pulses emitted at a single measurement point is not a limitation of the present invention. For example, in some embodiments, a single long range pulse may be emitted, where the single long range pulse has a higher energy than the short range pulse. Also for example, in some embodiments, multiple long range pulses may be emitted, and each long range pulse may have an energy level that is the same as the short range pulse, but the total energy of the multiple long range pulses is greater than the energy of the short range pulse.

Any number of pulses at any energy level may be employed to define multiple ranges. For example, a short range may be defined by the energy of a single short range pulse. Also for example, a medium range may be defined by multiple pulses, each having the same energy as the short range pulse, and a long range may be defined by one or more long range pulses with the same or greater energy as the short range pulse.

In some embodiments, a short range pulse is emitted at every measurement point, and in other embodiments, short range pulses are not emitted at every measurement point. For example, a short range pulse may be emitted at a first measurement point, and if a short range object is not detected, then long range pulses may be emitted at one or more subsequent measurement point without first emitting a short range pulse. This is possible in some embodiments, in part, because measurement points may be defined sufficiently close to one another to enable a valid assumption that when no short range object occupies a measurement point, no short range object occupies some number of subsequent measurement points.

In general, measurement points are points on the scan trajectory at which the scanning laser device measures distance. For example, in some embodiments, a LiDAR system emits a short range pulse at each measurement point to detect if an object is within the short range distance and then conditionally emit one or more long range pulses as described above. Thus, the term "measurement point" as used herein is not meant to designate an infinitely small point in space, but rather a small and finite continuous section of the scan trajectory. Specifically, an IR laser light beam traverses a finite section of the scan trajectory during the round trip transit times of a short range pulse and long range pulse at each measurement point. The measurement point area is also a function of laser spot size (initial size and divergence) at the distance where it encounters an object. Accordingly, the "measurement point" encompasses an area, albeit very small, and the size and location of the area may be a function of many factors.

The embodiments described herein facilitate the reliable detection of these short range pulses. Again, as described above, in some embodiments the system may emit short range pulse 910 and then conditionally emit one or more of long range pulses 930 based on whether a short range object is detected. In such systems it is desirable to facilitate the reliable detection of short range pulses so that long range pulses can be consistently emitted to provide long range object detection. Returning now to FIG. 8, the second IR detector 1842 can be implemented in accordance with any of the embodiments described above (e.g. detectors 106, 306, 406) to facilitate the reliable detection of these low energy short range pulses.

As such, the second IR detector 1842 can be implemented with multiple sensors configured to receive reflections through at least some of the same scanning mirror assembly 814, beam shaping optics, and other optical elements used to scan the laser light pulses into the scan field. Because the same optical assembly is used by the multiple sensors to receive the laser light reflections any damage or blockage that prevents the multiple sensors from receiving the reflections from short range pulses would also have likely blocked the scanning of the laser light pulses into the scan field. Thus, the second IR detector 1842 can more reliably detect short range pulses that have impacted an object in the scan field and reflected back toward the detector, and can thus be used to determine that long range pulses can be emitted safely. Furthermore, the multiple sensors in the second IR detector 1842 are configured to at least partially cancel the effects of back reflections from within the optical assembly. The cancellation of the effects of back reflections from within the optical assembly can improve the sensitivity of the detector, particularly for the detection of low energy short range reflections of laser pulses from within the scan field 828.

Figure 10:
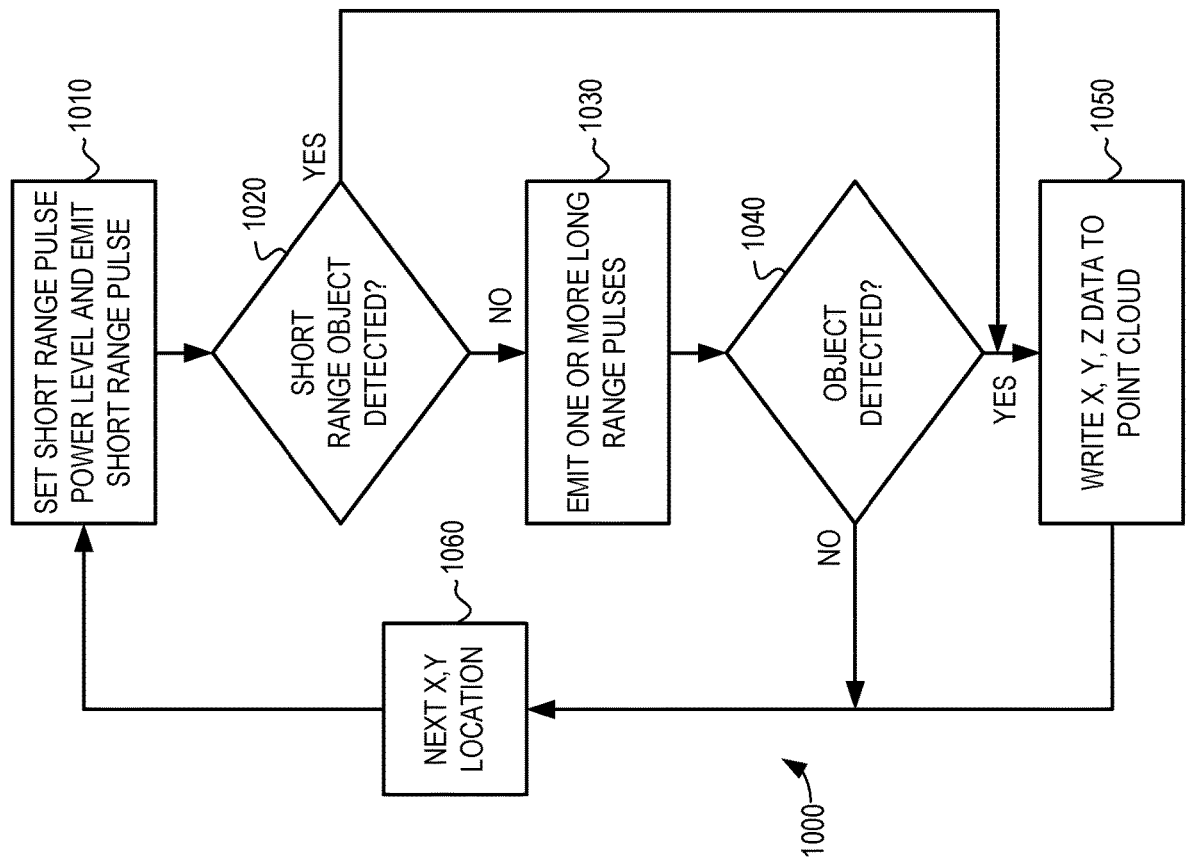
FIG. 10 shows a flow diagram of methods in accordance with various embodiments of the present invention.

Turning now to FIG. 10, a flow diagram of methods in accordance with various embodiments are illustrated. In some embodiments, method 1000, or portions thereof, is performed by a scanning laser device (e.g., LiDAR system 800 of FIG. 8). In other embodiments, method 1000 is performed by a series of circuits or an electronic system. Method 1000 is not limited by the particular type of apparatus performing the method. The various actions in method 1000 may be performed in the order presented, or may be performed in a different order. Further, in some embodiments, some actions listed in FIG. 4. are omitted from method 1000.

Method 1000 is shown beginning with block 1010 in which a short range pulse energy level is set and the short range pulse is emitted. In some embodiments, this corresponds to setting a pulse energy level to a value that will result in eye-safe operation at a particular distance from the LiDAR system. For example, in some embodiments, a short range pulse energy level may be set by a virtual protective housing circuit (e.g., virtual protective housing circuit 880 in FIG. 8) such that accessible emissions result in eye-safe operations at 100 mm, and in other embodiments, the pulse energy level may be set such that accessible emissions result in eye-safe operations at a minimum distance greater than 100 mm.

If a short range object is detected at 1020, then a 3D point (X,Y,Z) may be written to a 3D point cloud storage device such as 3D storage device 846 (FIG. 8). If a short range object is not detected, then one or more long range pulses may be transmitted at 1040. As described above, short range object detection may be accomplished by detecting a reflection of the short rang pulse, measuring the time-of-flight of the detected reflection, and comparing that time-of-flight to a threshold. The value of the threshold corresponding to the short range distance may be set to any suitable value.

At 1030, one or more long range pulses are emitted. If an object is detected at 440, then a 3D point (X,Y,Z) may be written to a 3D point cloud storage device (e.g., 3D storage device 846 in FIG. 8) and processing continues at the next measurement point at 460. If an object is not detected, then processing continues at the next measurement point at 1060 without writing a 3D point to the point cloud storage device.

Figure 11:
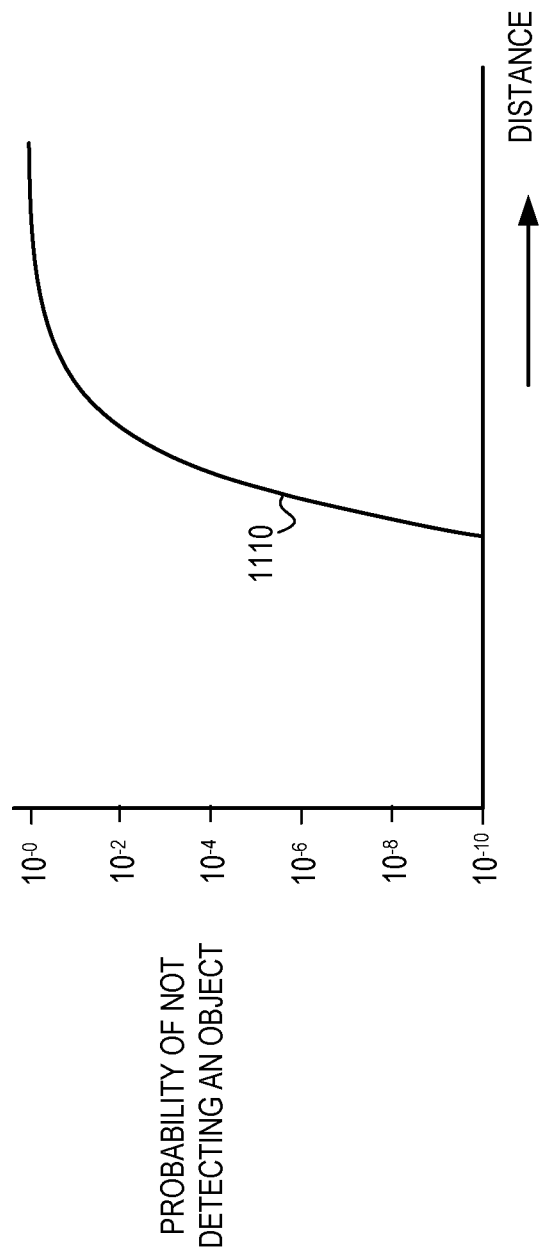
FIG. 11 shows a graph of probability of not detecting an object as function of distance in accordance with various embodiments of the present invention.

Turning now to FIG. 11 a graph illustrates a probability of not detecting an object as a function of distance in accordance with various embodiments. Probability curve 1110 is a typical curve that may shift left or right based on many parameters including pulse energy level, reflectivity of the object, ambient light, etc. For example, in extremely bright sunlight, a short range pulse that is eye-safe at 100 mm may have $10^{-10}$ probability of not detecting an object with a 20% reflectivity at 20 m. This results in an even lower probability of not detecting an object at closer distances, so in this same scenario, a long range pulse that is eye-safe at 5 m provides a very robust virtual protective housing.

In some embodiments, the threshold corresponding to the short range distance and the energy level of the long range pulse(s) are set to values that result in the short range distance and the minimum eye-safe distance of the long range pulse(s) being equal. In other embodiments, the threshold corresponding to the short range distance and the energy level of the long range pulse(s) are set to values that result in the short range distance being greater than minimum eye-safe distance of the long range pulse(s).

Figure 12:
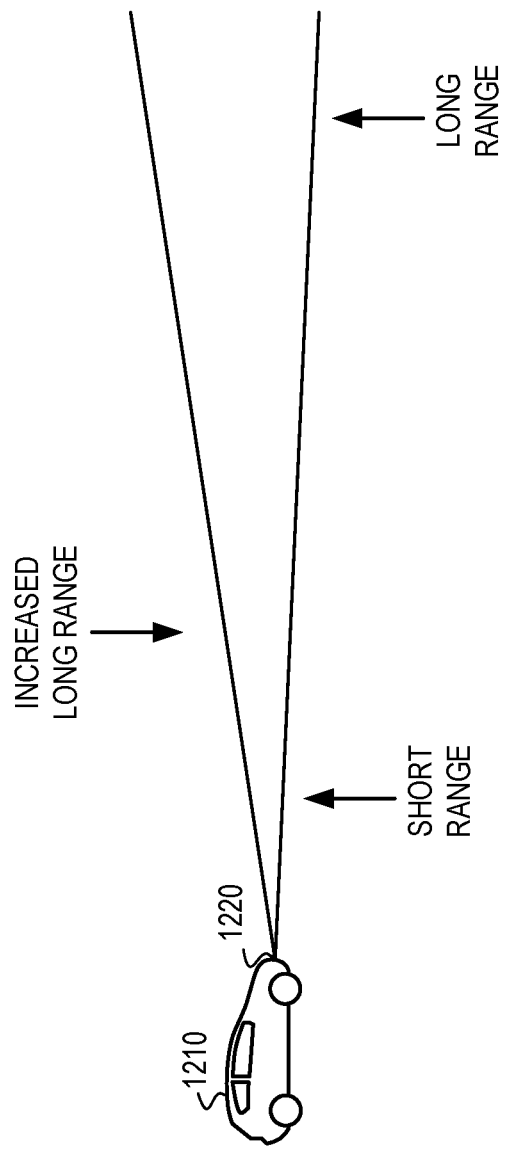
FIG. 12 shows a moving platform with a LiDAR system in accordance with various embodiments of the present invention.

Turning now to FIG. 12, one application of a scanning laser device (e.g., scanning laser device 100) is illustrated. Specifically, FIG. 12 illustrates a moving platform with an eye-safe scanning LiDAR system in accordance with various embodiments. Automobile 1210 is a movable platform upon which an eye-safe LiDAR system 1220 is mounted. In some embodiments, eye-safe LiDAR system 1220 is implemented using the various embodiments discussed herein (e.g., LiDAR system 800 of FIG. 8 or LiDAR system 1300 of FIG. 13) or any of the scanning laser devices discussed herein.

In some embodiments, the energy of short range pulses is increased when the platform upon which the LiDAR system is mounted is in motion. For example, when automobile 1210 has a velocity above a threshold, the energy of short range pulses may have a level that results in accessible emissions eye-safe level at a minimum distance above 100 mm. In some embodiments, the minimum distance at which the accessible emissions result in eye-safe level may be a meter or more. Also for example, the energy of short range pulses may be increased with increased platform velocity. In some embodiments, the energy of short range pulses may be gradually increased as the platform accelerates between 2.5 meters per second (m/s) and 25 m/s.

Increasing the energy level of short range pulses may result in increased probability of detecting objects within the short range and/or increasing the short range within which objects can be detected. FIG. 12 shows an increased short range as a result of increased short range pulse energy.

In some embodiments, the short range pulse energy level is set such that the accessible emissions are eye-safe at a short distance (e.g., 100 mm or less), and the time threshold is set to a value that provides a very low probability of not detecting an object. Then, if a velocity of the moving platform (e.g., an automobile) is not faster than a threshold the short range pulse is emitted. If instead the velocity of the moving platform is faster than a threshold, the short range pulse energy level and the time threshold corresponding to the short range distance can be increased. In some embodiments, the short range pulse energy is increased to a level that results in accessible emissions that result in eye-safe levels at a minimum distance of one meter. In other embodiments, the short range pulse energy is increased to a level that results in accessible emissions that result in eye-safe levels at a minimum distance greater than or less than one meter.

In some embodiments, the velocity of the moving platform can be determined using a velocity sensor on the LiDAR system. In other embodiments, the velocity information can be obtained from a sensor on the moving platform (e.g. a sensor on an automobile).

Figure 13:
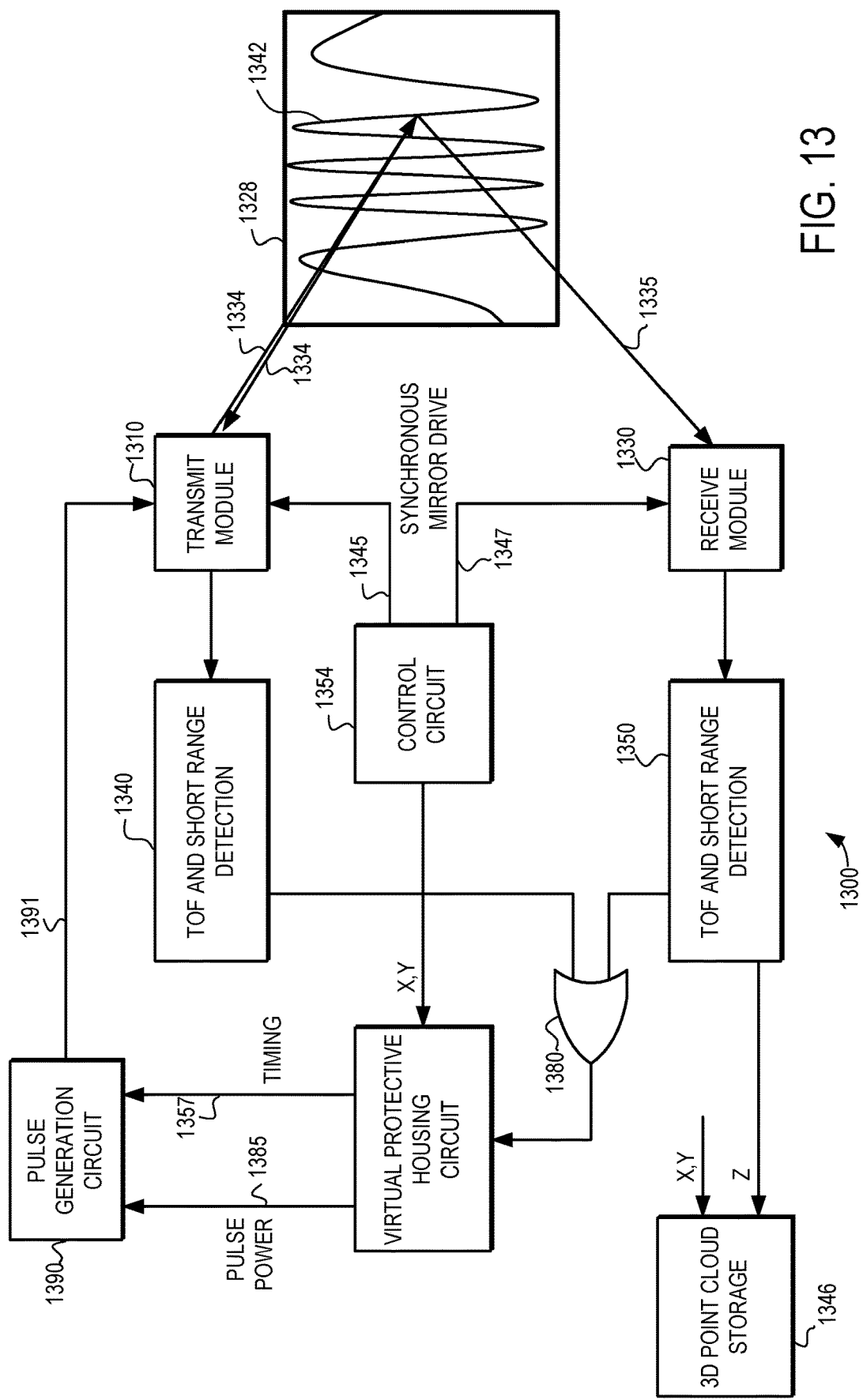
FIG. 13 shows a schematic view of a LiDAR system in accordance with various embodiments of the present invention.

Turning now to FIG. 13, a scanning light detection and ranging (LiDAR) system 1300 in accordance with various embodiments is illustrated. The LiDAR system 1300 is another example of the type of scanning laser device that can be implemented in accordance with the embodiments described herein. LiDAR system 1300 includes VPH circuit 1384, pulse generation circuit 1390, 3D point cloud storage device 1346, OR gate 1380, and control circuit 1354. LiDAR system 1300 also includes transmit module 1310, receive module 1330, TOF and short range detection circuits 1340, and TOF and short range detection circuits 1350.

Notably, the LiDAR system 1300 includes two separate IR detectors and TOF and short range detection circuits for detecting reflections of IR laser pulses. Specifically, the receive module 1330 includes a first IR detector implemented to detect reflections from both short range and long range pulses, while the transmit module 1310 includes a second IR detector that provides for the redundant detection of reflections from low power short range pulses to provide increased eye safety. And as will be described in more detail below, the second detector can be implemented with multiple sensors to at least partially cancel the effects of back reflections from within the transmit module 1310.

Transmit module 1310 includes an IR laser light source to produce a pulsed laser beam, collimating and focusing optics, and one or more scanning mirror assemblies implemented together in an optical assembly to scan the pulsed laser beam in two dimensions in the field of view. Transmit module 1310 also includes an IR laser light detector that shares an optical path with emitted IR laser light pulses. Example embodiments of transmit modules are described more fully below with reference to later figures.

Receive module 1330 includes optical devices and one or more scanning mirror assemblies to scan in two dimensions to direct reflected light from the field of view to an included IR light detector. Example embodiments of receive modules are described more fully below with reference to later figures.

Each of TOF and short range detection circuits 1340 and 1350 include a TOF measurement circuit and comparator. For example, TOF and short range detection circuits 1340 may include TOF circuit 1844 and second comparator 1848, and TOF and short range detection circuits 1350 may include TOF measurement circuit 844 and comparator 848 (FIG. 8).

Control circuit 1354 controls the movement of scanning mirrors within transmit module 1310 as described above with reference to FIG. 8. Control circuit 1354 also controls the movement of scanning mirrors within receive module 1330. In operation, control circuit 1354 receives mirror position feedback information (not shown) from transmit module 1310, and also receives mirror position feedback information (not shown) from receive module 1330. The mirror position feedback information is used to phase lock the operation of the mirrors.

Control circuit 1354 drives microelectromechanical (MEMS) assemblies with scanning mirrors within transmit module 1310 with drive signal(s) 1345 and also drives MEMS assemblies with scanning mirrors within receive module 1330 with drive signal(s) 1347 that cause the mirrors to move through angular extents of mirror deflection that define the scan trajectory 1342 and the size and location of scan field 1328. The synchronization of transmit and receive scanning allows the receive aperture to only accept photons from the portion of the field of view where the transmitted energy was transmitted. This results in significant ambient light noise immunity.

As shown in FIG. 13, the two dimensional scanning is performed in a first dimension (vertical, fast scan direction) and a second dimension (horizontal, slow scan direction). The labels "vertical" and "horizontal" are somewhat arbitrary, since a 90 degree rotation of the apparatus will switch the horizontal and vertical axes.

Also, notably in the example of FIG. 13, scan trajectory 1342 is expanded along the horizontal axis with a non-uniform variation in optical expansion. Such an expansion can be implemented through the use of expansion optics as described above. For example, the three expansion lenses 620, 622, and 624 in FIGS. 6 and 7 can be implemented in system 1300. In such an implementation the expansion optics would be implemented in transmit module 1310 provide for the non-uniform expansion in the horizontal direction as the laser light pulses and scanned into the scan field 1328. As illustrated in FIGS. 6 and 7 these three expansion lenses can be implemented between a first scanning mirror 618 and a second scanning mirror 628. Likewise, in such an embodiment corresponding optics (i.e., scanning mirrors and expansion optics) would be implemented in receive module 1330 to provide for a corresponding non-uniform reduction in the optical expansion for received reflections of laser light pulses from the scan field 1328.

Also as described above, the transmit module 1310 can be implemented with a second IR detector in accordance with any of the embodiments described herein (e.g. detectors 106, 306, 406). As such, the second IR detector can be implemented to share at least part of an optical path with the laser beam pulses. Specifically, the second IR detector can be implemented with multiple sensors configured to receive reflections through at least some of the same scanning mirrors, beam shaping optics, and other optical elements in the transmit module 1310 that are used to scan the laser light pulses into the scan field. As such the second IR detector can more reliably detect any laser light that has impacted an object in the scan field and reflected back toward the detector, and can thus be used to provide increased laser safety. Furthermore, the multiple sensors in the second IR detector can be configured to at least partially cancel the effects of back reflections from within the optical assembly. The cancellation of the effects of back reflections from within the optical assembly can improve the sensitivity of the detector, particularly for the detection of low energy reflections of short range laser light pulses from within the scan field 1328.

Figure 14:
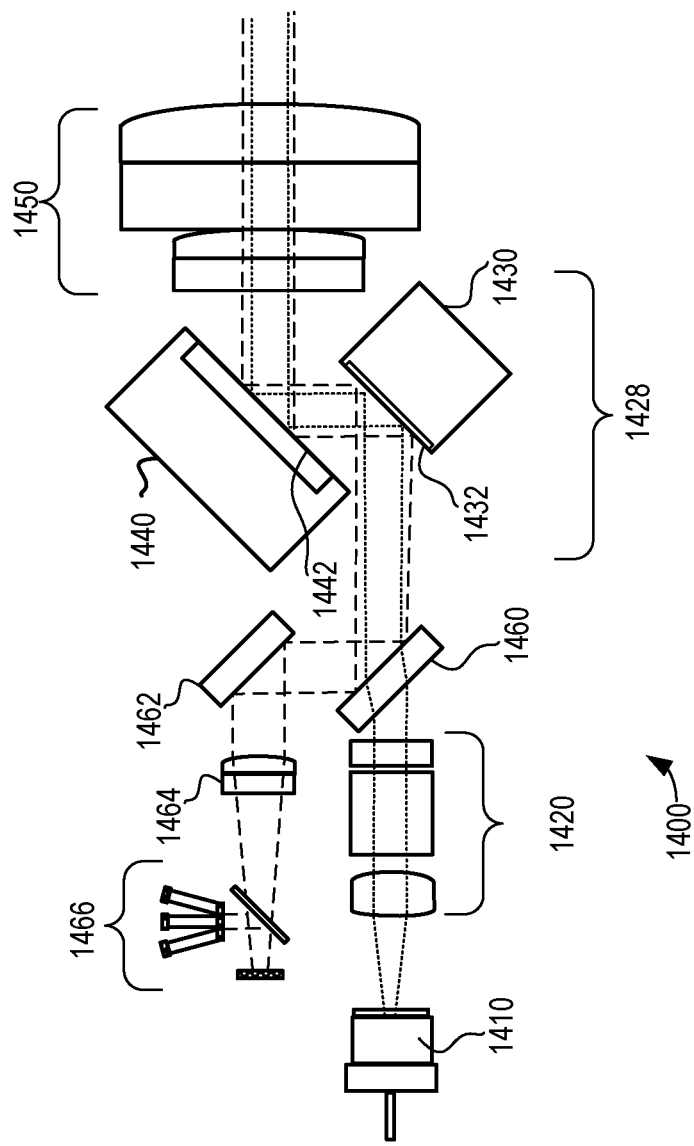
FIG. 14 shows a side view of a transmit module in accordance with various embodiments of the present invention.
Figure 15:
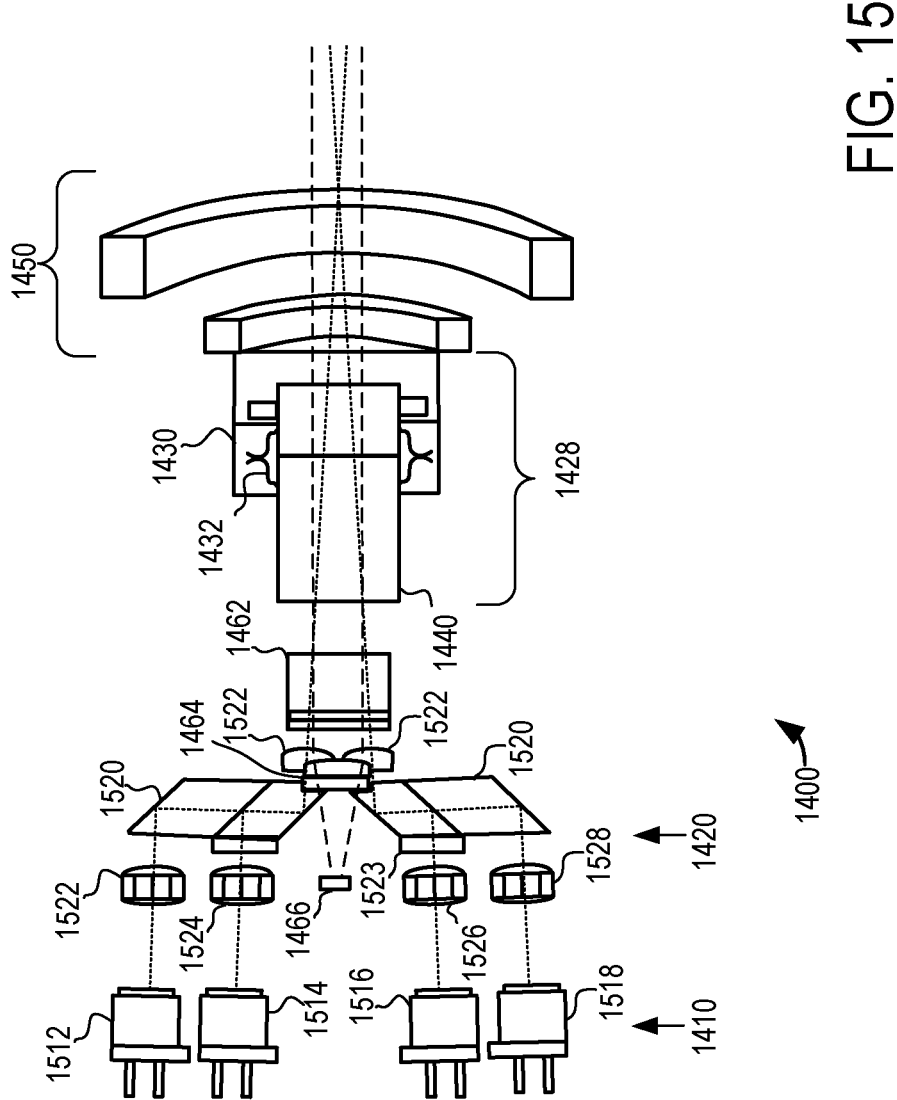
FIG. 15 shows a top view of a transmit module in accordance with various embodiments of the present invention.

Turning now to FIGS. 14 and 15, FIG. 14 shows a side view and FIG. 15 shows a top view of a transmit module 1400. Transmit module 1400 is an example of transmit module that can be used in a LiDAR system (e.g., transmit module 1310 of FIG. 10). Transmit module 1400 includes laser light source 1410, beam shaping optical devices 1420, received energy pickoff device 1460, mirror 1462, beam shaping device 1464, IR detector 1466, scanner 1428, and exit optical devices 1450.

Figure 16:
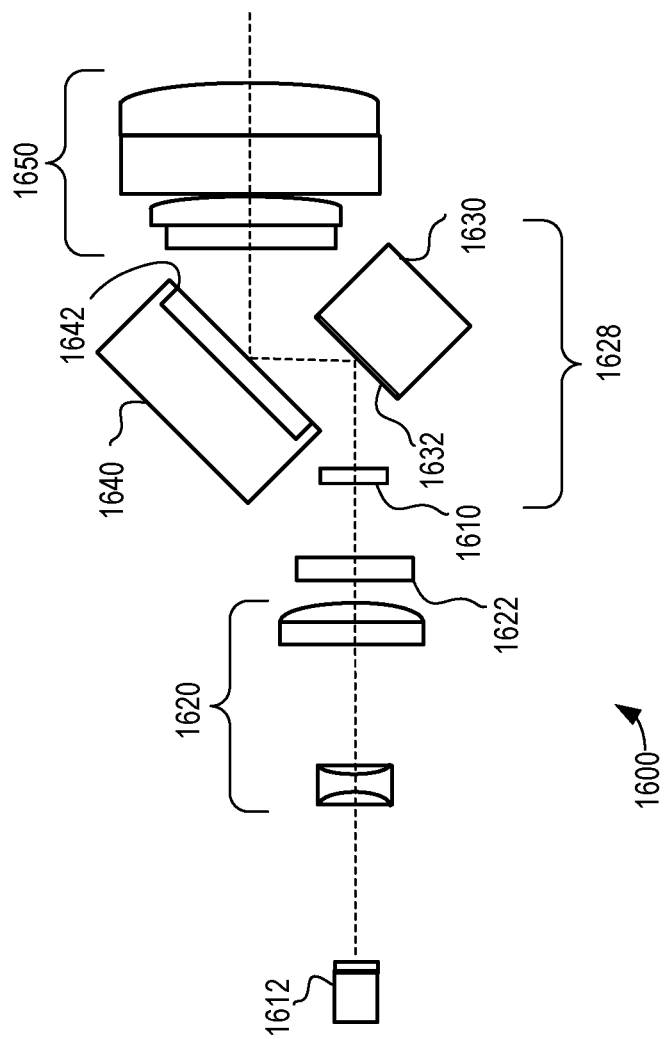
FIG. 16 shows a side view of a receive module in accordance with various embodiments of the present invention.

In some embodiments, laser light source 1410 sources generate nonvisible light such as infrared (IR) light. In these embodiments, IR detector 1466 detects the same wavelength of nonvisible light, as does an IR detector in receive module 1600 (FIG. 16, discussed below). For example, in some embodiments, laser light source 1410 may include a laser diode that produces infrared light with a wavelength of substantially 905 nanometers (nm), and IR detector 1466 detects reflected light pulses with a wavelength of substantially 905 nm. Also for example, in some embodiments, laser light source 1410 may include a laser diode that produces infrared light with a wavelength of substantially 940 nanometers (nm), and IR detector 1466 detects reflected light pulses with a wavelength of substantially 940 nm. The wavelength of light is not a limitation of the present invention. Any wavelength, visible or nonvisible, may be used without departing from the scope of the present invention.

Laser light source 1410 may include any number or type of emitter suitable to produce a pulsed laser beam. For example, in some embodiments, laser light source 1410 includes multiple laser diodes shown in FIG. 15 at 1512, 1514, 1516, and 1518. The pulsed laser light produced by laser light source 1410 is combined, collimated, and focused by beam shaping optical devices 1420 to produce a pulsed laser beam. For example, optical devices 1522, 1524, 1526, 1528 may collimate the laser beams on the fast axis, polarization rotators 1523 and beam combiners 1520 may combine laser beams, and optical devices 1522 may form the pulsed laser beam into a fan on the slow axis. Beam sizes and divergence values are not necessarily uniform across the various embodiments of the present invention; some embodiments have higher values, and some embodiments have lower values.

Scanner 1428 receives the pulsed laser beam from optical devices 1420 and scans the pulsed beam in two dimensions. In embodiments represented by FIGS. 14 and 15, scanner 1428 includes two separate scanning mirror assemblies 1430, 1440, each including a scanning mirror 1432, 1442, where each scanning mirror scans the beam in one dimension. For example, scanning mirror 1432 scans the pulsed beam in the fast scan direction, and scanning mirror 1442 scans the pulsed beam in the slow scan direction.

Although scanner 1428 is shown including two scanning mirror assemblies, where each scans in a separate dimension, this is not a limitation of the present invention. For example, in some embodiments, scanner 1428 is implemented using a single biaxial scanning mirror assembly that scans in two dimensions. In some embodiments, scanning devices uses electromagnetic actuation, achieved using a miniature assembly containing a MEMS die and small subassemblies of permanent magnets and an electrical interface, although the various embodiments are not limited in this respect.

Exit optical devices 1450 operate on the scanning pulsed laser beam as it leaves the transmit module. In some embodiments, exit optical devices 1450 perform field expansion. For example, scanner 1428 may scan through maximum angular extents of 20 degrees on the fast scan axis, and may scan through maximum angular extents of 40 degrees on the slow scan axis, and exit optical devices 1450 may expand the field of view to 30 degrees on the fast scan axis and 120 degrees on the slow scan axis. The relationship between scan angles of scanning mirrors and the amount of field expansion provided by exit optical devices 1450 is not a limitation of the present invention.

Received energy pickoff device 1460 deflects received light (shown as a dotted line) that shares at least part of the transmit optical path with the emitted light pulses (shown as a solid line). The deflected received light is then reflected by mirror 1462, focused by optical device 1064, and detected by IR detector 1466. In some embodiments, pickoff device 1460 includes a "window" that transmits the pulsed beam produced by the IR laser light source, and a reflective outer portion to deflect received energy outside the window. In other embodiments, pickoff device 1460 is a partial reflector that transmits a portion of incident light and reflects the rest. For example, a reflector that transmits 90% of incident light and reflects 10% of incident light will provide the IR detector 1466 with 10% of the light reflected off an object in the field of view. In still further embodiments, pickoff device 1460 may incorporate a polarizing beam splitter that transmits the pulsed laser beam (at a first polarization), and picks off received light of a different polarization. This is effective, in part, due to the reflections being randomly polarized due to Lambertian reflection. In still further embodiments, the outgoing laser beam and received energy may be directed to different portions of the scanning mirrors, and pickoff device 1460 may be an offset mirror positioned to reflect one but not the other.

Again, the embodiments described herein facilitate the reliable detection of low energy short range pulses. To facilitate this, the IR detector 1466 can be implemented in accordance with any of the embodiments described above (e.g. detectors 106, 306, 406) to facilitate the reliable detection of these low energy short range pulses.

Specifically, the IR detector 1466 can be implemented with multiple sensors configured to receive reflections through at least some of the same optical assembly used to transmit laser light pulses into the scan field. Specifically, the IR detector 1466 can be configured to receive laser light pulses through the same scanning mirrors 1432, 1142, exit optical devices 1450, and other optical elements used to transmit the laser light pulses into the scan field. Because the same optical assembly is used by the multiple sensors to receive the laser light reflections any damage or blockage that prevents the multiple sensors from receiving the reflections from short range pulses would also have likely blocked the scanning of the laser light pulses into the scan field. Thus, the IR detector 1466 can more reliably detect short range pulses that have impacted an object in the scan field and reflected back toward the detector, and can thus be used to reliably determine when long range pulses can be emitted safely. Furthermore, the multiple sensors in the IR detector 1466 are configured to at least partially cancel the effects of back reflections from within the optical assembly. The cancellation of the effects of back reflections from within the optical assembly can improve the sensitivity of the detector, particularly for the detection of low energy short range reflections of laser pulses from within the scan field.

Figure 17:
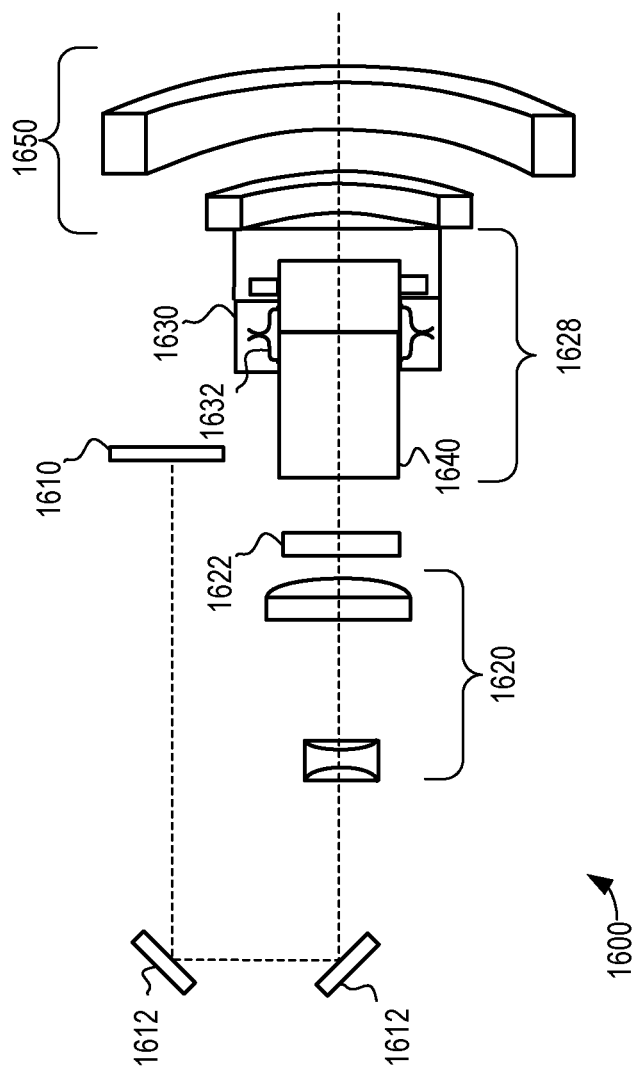
FIG. 17 shows a top view of a receive module in accordance with various embodiments of the present invention.

Turning now to FIGS. 16 and 17, FIG. 16 shows a side view and FIG. 17 shows a top view of a receive module 1600. Receive module 1600 is an example of receive module that can be used in a LiDAR system (e.g., receive module 1330 of FIG. 13). Receive module 1600 includes IR detector 1610, fold mirrors 1612, imaging optical devices 1620, bandpass filter 1622, scanner 1628, and exit optical devices 1650.

Scanning mirror assemblies 1630 and 1640 are similar or identical to scanning mirror assemblies 1430 and 1440, and exit optical devices 1650 are similar or identical to exit optical devices 1450. Bandpass filter 1422 passes the wavelength of light that is produced by laser light source 1410, and blocks ambient light of other wavelengths. For example, in some embodiments, the laser light source produces light at 905 nm, and bandpass filter 1622 passes light at 905 nm.

Imaging optical devices 1620 image a portion of the field of view onto IR detector 1610 after reflection by fold mirrors 1612. Because scanner 1628 is scanned synchronously with scanner 1428, detector 1610 always collects light from the measurement points illuminated by the scanned pulsed beam.

Figure 18:
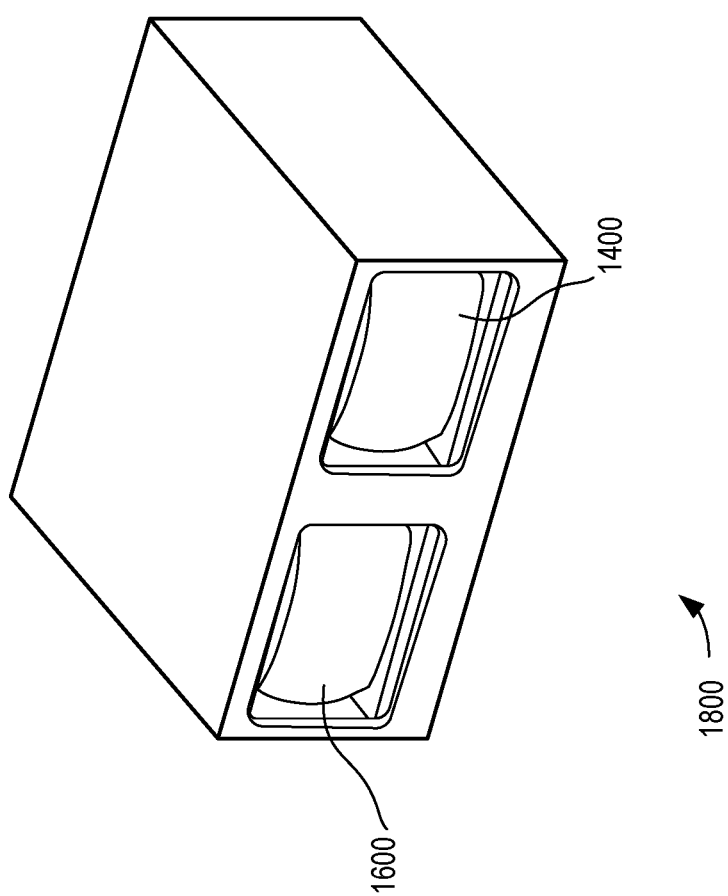
FIG. 18 shows a perspective view of an integrated photonics module in accordance with various embodiments of the present invention.

FIG. 18 shows a perspective view of an integrated photonics module in accordance with various embodiments of the present invention. Integrated photonics module 1800 includes both transmit module 1400 (FIGS. 14 and 15) and receive module 16 (FIGS. 16 and 17). Integrated photonics module 1800 is shown having a rectangular housing with transmit module 1400 and receive module 1600 placed side by side. In some embodiments, transmit module 1400 and receive module 1600 are placed one on top of the other.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a laser light source configured to produce laser light pulses;
   an optical assembly, the optical assembly including optical elements to scan the laser light pulses into a scan field;
   a first detector, the first detector including:
      a first sensor configured to receive reflections of the laser light pulses from objects within the scan field through the optical assembly and to further receive back reflections of the laser light pulses from the optical elements within the optical assembly;
      a second sensor configured to receive back reflections of the laser light pulses from within the optical assembly while not receiving significant reflections from objects within the scan field; and
      a sensing circuit coupled to the first sensor and the second sensor, the sensing circuit configured to at least partially cancel effects of the back reflections to generate an output signal indicative of a reflection from an object in the scan field.

2. The apparatus of claim 1, wherein first sensor has a first sensor field of view, wherein the first sensor field of view is optically aligned with the laser light pulses scanned into the scan field, and wherein the second sensor has a second sensor field of view, wherein the second sensor field of view is not optically aligned with the laser light pulses scanned into the scan field.

3. The apparatus of claim 2, wherein the first sensor field of view of the first sensor and the second sensor field of view of the second sensor have an optical alignment difference of between 1 degree and 3 degrees.

4. The apparatus of claim 1, wherein the first sensor is configured with optics to have a working distance between 2 and 6 meters from the apparatus.

5. The apparatus of claim 4, further comprising a short-range sensor configured to receive reflections of the laser light pulses from within the scan field through the optical assembly, the short-range sensor configured with optics have a working distance between 0.1 and 2 meters from the apparatus.

6. The apparatus of claim 5, wherein the first sensor comprises a first silicon photomultiplier and wherein the second sensor comprises a second silicon photomultiplier, and wherein the short-range sensor comprises a photodiode.

7. The apparatus of claim 1, wherein the first sensor is optically coupled to the optical assembly through a first aperture and a first light pipe, and wherein the second sensor is optically coupled to the optical assembly through a second aperture and a second light pipe.

8. The apparatus of claim 1, wherein the optical elements in the optical assembly include at least one scanning mirror and at least one expansion lens.

9. The apparatus of claim 1, wherein the sensing circuit comprises a subtraction device to subtract an output of the first sensor from an output of the second sensor.

10. The apparatus of claim 9, wherein the sensing circuit comprises a first calibration circuit to calibrate the subtraction of the output of the second sensor from the output of the first sensor.

11. The apparatus of claim 10, wherein the sensing circuit further comprises a second calibration circuit to calibrate a threshold for detection of an object in the scan field.

12. The apparatus of claim 1, wherein the first detector further comprises a third sensor, the third sensor configured to receive back reflections of the laser light pulses from within the optical assembly while not receiving significant reflections from objects within the scan field, and wherein the a sensing circuit is additionally coupled to the third sensor.

13. The apparatus of claim 1, further comprising a second detector, the second detector configured to receive reflections of the laser light pulses of the laser light pulses from within the scan field through a second optical assembly separate from and not including the optical elements of the optical assembly.

14. The apparatus of claim 1, further comprising:
time-of-flight (TOF) circuitry responsive to the first detector to measure distances to objects at a depth measurement points in the scan field; and
a virtual protective housing circuit that, for a plurality of depth measurement points, causes the laser light source to emit a first laser light pulse at a first energy level to detect an object within a short range, and responsive to determining that there is no object within the short range causes the laser light source to emit at least one second laser light pulse having a total second energy level to detect an object within a long range, wherein the first energy level is lower than the total second energy level.

15. An apparatus comprising:
a laser light source configured to produce infrared (IR) laser light pulses;
an optical assembly, the optical assembly including beam shaping optics that include at least one lens and beam scanning optics that include at least one scanning mirror to scan the IR laser light pulses into a scan field;
a first IR light detector, the first IR light detector including:
a first sensor, the first sensor configured to have a sensor field of view optically aligned with the IR laser light pulses scanned into the scan field such that the first sensor receives reflections of the IR laser light pulses from objects within the scan field through the optical assembly and further receives back reflections of the IR laser light pulses from the at least one scanning mirror and at least one lens within the optical assembly, the first sensor further configured to generate a first sensing signal proportional to reflected energy in the received reflections from within the scan field plus reflected energy in the received back reflections;
a second sensor, the second sensor configured to have a sensor field of view not optically aligned with the IR laser light pulses scanned into the field of view such that the second sensor receives back reflections of the IR laser light pulses from within the optical assembly while not receiving substantial reflections from objects within the scan field, the second sensor further configured to generate a second sensing signal proportional to the reflected energy in the received back reflections; and
a sensing circuit coupled to the first sensor and configured to receive the first sensing signal, the sensing circuit further coupled to the second sensor and configured to receive the second sensing signal, the sensing circuit including a subtraction device configured to subtract the second sensing signal from the first sensing signal to at least partially cancel effects of the back reflections and generate an output signal indicative of a reflection from an object in the scan field.

16. The apparatus of claim 15, where the first IR light detector includes a third sensor, the third sensor configured to have a sensor field of view not optically aligned with the IR laser light pulses scanned into the field of view such that the third sensor receives back reflections of the IR laser light pulses from within the optical assembly while not receiving substantial reflections from objects within the scan field, the third sensor further configured to generate a third sensing signal proportional to the reflected energy in the received back reflections, and wherein the subtraction device further subtracts the third sensing signal from the first sensing signal to generate the output signal.

17. The apparatus of claim 15, wherein the sensing circuit further comprises a first calibration circuit, the first calibration circuit configured to calibrate the subtraction the second sensing signal from the first sensing signal by adjusting a gain of an amplifier.

18. The apparatus of claim 17, wherein the sensing circuit further comprises a second calibration circuit, the second calibration circuit configured to calibrate a threshold for detection of reflections from an object in the scan field.

19. The apparatus of claim 15, wherein the beam shaping optics include expansion optics configured to provide a non-uniform variation in optical expansion relative to position along a first axis of the IR laser light pulses in the scan field.

20. A scanning laser device comprising:
a laser light source configured to produce infrared (IR) laser light pulses;
an optical assembly, the optical assembly including beam shaping optics that include at least one lens and beam scanning optics that include at least one scanning mirror to scan the IR laser light pulses into a scan field;
a first IR light detector, the first IR light detector including:
a first sensor, the first sensor configured to have a sensor field of view optically aligned with the IR laser light pulses scanned into the scan field such that the first sensor receives reflections of the IR laser light pulses from objects within the scan field through the optical assembly and further receives back reflections of the IR laser light pulses from the at least one scanning mirror and at least one lens within the optical assembly, the first sensor further configured to generate a first sensing signal proportional to reflected energy in the received reflections from within the scan field plus reflected energy in the received back reflections, the first sensor configured with optics to have a working distance between 2 and 6 meters from the apparatus;

a second sensor, the second sensor configured to have a sensor field of view with an optical alignment of difference of between 1 and 3 degrees with the IR laser light pulses scanned into the field of view such that the second sensor receives back reflections of the IR laser light pulses from within the optical assembly while receiving less than 5 percent of reflected energy from objects within the scan field compared to the first sensor, the second sensor further configured to generate a second sensing signal proportional to the reflected energy in the received back reflections, the second sensor configured with optics to have a working distance between 2 and 6 meters from the apparatus;

a short-range sensor configured to receive reflections of the laser light pulses from within the scan field through the optical assembly, the short-range sensor configured with optics have a working distance between 0.1 and 2 meters from the apparatus; and a sensing circuit coupled to the first sensor and configured to receive the first sensing signal, the sensing circuit further coupled to the second sensor and configured to receive the second sensing signal, the sensing circuit including a subtraction device configured to subtract the second sensing signal from the first sensing signal to at least partially cancel effects of the back reflections and generate an output signal indicative of a reflection from an object in the scan field.

* * * * *